US008676460B2

(12) United States Patent
Ueno et al.

(10) Patent No.: US 8,676,460 B2
(45) Date of Patent: Mar. 18, 2014

(54) SHIFT CONTROL DEVICE FOR VEHICLE

(75) Inventors: Koki Ueno, Toyota (JP); Takahiko Tsutsumi, Toyota (JP); Ichiro Kitaori, Nagoya (JP); Hiroatsu Endo, Nagoya (JP); Takashi Yuma, Toyota (JP); Masayuki Matsui, Ichinomiya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 97 days.

(21) Appl. No.: 13/260,401

(22) PCT Filed: Mar. 8, 2010

(86) PCT No.: PCT/JP2010/054276
§ 371 (c)(1),
(2), (4) Date: Sep. 26, 2011

(87) PCT Pub. No.: WO2010/110098
PCT Pub. Date: Sep. 30, 2010

(65) Prior Publication Data
US 2012/0022756 A1    Jan. 26, 2012

(30) Foreign Application Priority Data
Mar. 27, 2009    (JP) ................................. 2009-080094

(51) Int. Cl.
*G06F 7/00* (2006.01)
(52) U.S. Cl.
USPC .................................. 701/58; 701/62; 701/64
(58) Field of Classification Search
USPC ........................ 701/51–52, 64, 67, 55, 58, 62; 477/79–81, 83–84, 166, 169
See application file for complete search history.

(56) References Cited

U.S. PATENT DOCUMENTS 5,591,101 A    1/1997    Sakakiyama et al.
5,827,150 A    10/1998    Mukumoto
(Continued)

FOREIGN PATENT DOCUMENTS

JP    61-157441 A    7/1986
JP    5-223162 A    8/1993
(Continued)

OTHER PUBLICATIONS

International Search Report in International Application No. PCT/JP2010/054276; Mailing Date: Jul. 2, 2010.
(Continued)

*Primary Examiner* — Yonel Beaulieu
(74) *Attorney, Agent, or Firm* — Finnegan, Henderson, Farabow, Garrett & Dunner, LLP

(57) ABSTRACT

A shift control device is provided for a vehicle of shift-by-wire type having shift operation detecting means electrically detecting a shift operation of a driver, range switching means switching a shift range in response to the shift operation of the driver, failure detecting means detecting a failure in a shift operation detection executed by the shift operation detecting means, and vehicle state detecting means detecting a vehicle state upon detection of the failure in the shift operation detection, the range switching means being switched to a fail-safe mode, when the shift operation detection is recovered from a failed state to a normal state and the range switching means is switched from the fail-safe mode to a normal control mode, a recovery condition for determining switching of the fail-safe mode to the normal control mode being altered depending on the vehicle state.

20 Claims, 9 Drawing Sheets

(56) References Cited

U.S. PATENT DOCUMENTS

| | | | |
|---|---|---|---|
| 5,855,532 A | 1/1999 | Sugiyama | |
| 5,897,601 A * | 4/1999 | Suzuki | 701/78 |
| 6,030,316 A | 2/2000 | Kadota | |
| 6,047,679 A | 4/2000 | Matsumoto et al. | |
| 6,561,950 B1 | 5/2003 | Ohtsuka | |
| 6,655,343 B2 | 12/2003 | Suzuki et al. | |
| 6,659,911 B2 | 12/2003 | Suzuki et al. | |
| 6,779,508 B2 | 8/2004 | Fuwa | |
| 6,939,266 B2 | 9/2005 | Koerner et al. | |
| 7,367,854 B2 | 5/2008 | Arvidsson | |
| 7,426,854 B2 | 9/2008 | Endo et al. | |
| 7,563,197 B2 | 7/2009 | Ayabe et al. | |
| 7,625,313 B2 | 12/2009 | Kondo et al. | |
| 8,032,274 B2 | 10/2011 | Niwa et al. | |
| 8,335,619 B2 | 12/2012 | Ueno | |
| 2001/0045138 A1 | 11/2001 | Ohashi et al. | |
| 2002/0065169 A1 | 5/2002 | Suzuki et al. | |
| 2003/0105572 A1 | 6/2003 | Joe et al. | |
| 2003/0176258 A1 | 9/2003 | Ohtsuka | |
| 2004/0035391 A1 | 2/2004 | Fuwa | |
| 2004/0053743 A1 | 3/2004 | Tsuzuki et al. | |
| 2004/0162661 A1 | 8/2004 | Kikuchi | |
| 2004/0186646 A1 | 9/2004 | Kuwata et al. | |
| 2004/0226801 A1 | 11/2004 | De Jonge et al. | |
| 2004/0259685 A1 | 12/2004 | Inoue et al. | |
| 2005/0030009 A1 | 2/2005 | Moreno | |
| 2006/0258503 A1 | 11/2006 | Inoue et al. | |
| 2007/0087896 A1 | 4/2007 | Matsuzaki et al. | |
| 2007/0129214 A1 | 6/2007 | Kondo et al. | |
| 2007/0137337 A1 | 6/2007 | Kim | |
| 2008/0113848 A1 * | 5/2008 | Inoue et al. | 477/98 |
| 2009/0157251 A1 | 6/2009 | Niwa et al. | |
| 2010/0082209 A1 | 4/2010 | Yoshioka et al. | |
| 2010/0168956 A1 | 7/2010 | Ueno | |
| 2011/0010064 A1 | 1/2011 | Funakoshi et al. | |
| 2011/0125356 A1 | 5/2011 | Takahashi | |
| 2011/0202231 A1 | 8/2011 | Ueno et al. | |
| 2012/0022756 A1 | 1/2012 | Ueno et al. | |
| 2012/0232756 A1 | 9/2012 | Yuan et al. | |
| 2013/0000436 A1 | 1/2013 | Ueno | |

FOREIGN PATENT DOCUMENTS

| | | |
|---|---|---|
| JP | 08-303287 A | 11/1996 |
| JP | 09-152902 A | 6/1997 |
| JP | 11-245679 | 9/1999 |
| JP | 2000-145493 A | 5/2000 |
| JP | 2001-294056 A | 10/2001 |
| JP | 2001-304390 A | 10/2001 |
| JP | 2002-48234 A | 2/2002 |
| JP | 2002-213600 A | 7/2002 |
| JP | 2003-65436 A | 3/2003 |
| JP | 2003-072417 A | 3/2003 |
| JP | 2003-139227 A | 5/2003 |
| JP | 2009-139227 A | 5/2003 |
| JP | 2004-251309 A | 9/2004 |
| JP | 2004-293441 A | 10/2004 |
| JP | 2005-7993 A | 1/2005 |
| JP | 2006-162050 A | 6/2006 |
| JP | 2006-336717 | 12/2006 |
| JP | 2006-336717 A | 12/2006 |
| JP | 2006-349016 A | 12/2006 |
| JP | 2007-9946 A | 1/2007 |
| JP | 2007-62664 A | 3/2007 |
| JP | 2007-192338 A | 8/2007 |
| JP | 2008-290622 A | 12/2008 |

OTHER PUBLICATIONS

Written Opinion of the International Searching Authority in International Application No. PCT/JP2010/054276; Mailing Date: Jul. 2, 2010.
Office Action mailed Feb. 28, 2012 for U.S. Appl. No. 12/601,400.
Office Action mailed Mar. 16, 2012 for U.S. Appl. No. 12/601,400.
Office Action mailed Aug. 13, 2012 for U.S. Appl. No. 12/601,400.
Notice of Allowance and Fee(s) Due mailed Sep. 24, 2012 for U.S. Appl. No. 12/601,400.
Office Action mailed Jan. 11, 2013 for U.S. Appl. No. 13/124,981.
U.S. Appl. No. 12/601,400, filed Nov. 23, 2009.
U.S. Appl. No. 13/609,617, filed Sep. 11, 2012.
U.S. Appl. No. 13/124,981, filed Apr. 19, 2011.

* cited by examiner

SHIFT POSITION (LATERAL DIRECTION)

| SHIFT POSITION | POSITION "N" | POSITION "R" | POSITION "D" | POSITION "M" | POSITION "B" |
|---|---|---|---|---|---|
| DETECTION SIGNAL VOLTAGE $V_{SF}$ OF SHIFT SENSOR | mid | high | low | mid | low |
| DETECTION SIGNAL VOLTAGE $V_{SL}$ OF SELECT SENSOR | high | high | high | low | low |

SHIFT CONTROL DEVICE FOR VEHICLE

CROSS-REFERENCE TO RELATED APPLICATIONS

This application is a national phase application of International Application No. PCT/JP2010/054276, filed Mar. 8, 2010, and claims the priority of Japanese Application No. 2009-080094, filed Mar. 27, 2009, the contents of both of which are incorporated herein by reference.

FIELD OF THE INVENTION

The present invention relates to a shift control device for a shift-by-wire type vehicle and, more particularly, to a control executed when a shift control device is recovered from a failed state to a normal state.

DESCRIPTION OF THE RELATED ART

A shift control device for a shift-by-wire type vehicle has heretofore been well known as including: shift operation detecting means electrically detecting a shift operation of a driver; range switching means switching a shift range in response to the shift operation of the driver; failure detecting means detecting a failure in the shift operation detecting means; and vehicle state detecting means detecting a state of the vehicle. When a failure in shift operation detection is detected, the range switching means switches the shift range to a fail-safe mode. An example of such shift control device is disclosed, for instance, in Patent Publication 1 (Japanese Patent Publication No. 2006-336717) entitled as "a vehicle control system". Patent Publication 1 discloses a technology wherein if a failure occurs in a shift-by-wire system, a fail-safe control is executed by switching the shift range to a neutral range, whereas the fail-safe control is cancelled when a halt of the vehicle is confirmed or when a driver's intention for recovery of the range is confirmed.

DISCLOSURE OF THE INVENTION

Meanwhile, the vehicle control system disclosed in Patent Publication 1, takes a situation of the vehicle staying under a halt state to be one of conditions for canceling the fail-safe control. Accordingly, for example if a failure occurs in a shift sensor and the failure state is recovered to the normal state during running of the vehicle, the vehicle is caused to halt once after which the fail-safe control is cancelled. That is, when the fail-safe control is switched to a normal control, the vehicle is prevented from the continuous running. Further, when the driver's intention for the range recovery is confirmed, the fail-safe control is cancelled at an arbitrary timing set by the driver, so that a drive force may be generated against the driver's intention.

The present invention has been completed with the above view in mind, and has an object to provide a shift control device for vehicle configured to enable switch-over to a normal running mode without interrupting running of the vehicle with suppressing generation of a drive force against a driver's intention, when a failure state related to a shift operation detection is recovered to the normal state.

For achieving the above object, a first aspect of the present invention provides a shift control device for a vehicle of shift-by-wire type having shift operation detecting means electrically detecting a shift operation of a driver, range switching means switching a shift range in response to the shift operation of the driver, failure detecting means detecting a failure in a shift operation detection executed by the shift operation detecting means, and vehicle state detecting means detecting a vehicle state upon detection of the failure in the shift operation detection, the range switching means being switched to a fail-safe mode. The shift control device is characterized in that when the shift operation detection is recovered from a failed state to a normal state and the range switching means is switched from the fail-safe mode to a normal control mode, a recovery condition for determining switching of the fail-safe mode to the normal control mode is altered depending on the vehicle state.

A second aspect of the present invention is featured by, in the first aspect, that the vehicle state detected by the vehicle state detecting means includes a drive force, a vehicle speed or acceleration.

A third aspect of the present invention is featured by, in the second aspect, that in the vehicle state where a variation in the drive force is large the recovery condition is made stricter than that in the vehicle state where the variation in the drive force is small upon switch-over to the normal control mode.

A fourth aspect of the present invention is featured by, in the third aspect, that a predetermined vehicle-speed region in which the variation in the drive force becomes large upon switch-over to the normal control mode is preliminarily determined, the switch-over to the normal control mode is performed out of the predetermined vehicle-speed region, and in the predetermined vehicle-speed region, the switch-over to the normal control mode is performed under the recovery condition including at least one of a turn-off operation of an accelerator pedal and a turn-on operation of a brake pedal.

A fifth aspect of the present invention is featured by, in the third or fourth aspect, that the predetermined vehicle-speed region in which the variation in the drive force is large upon switch-over to the normal control mode is preliminarily determined, the switch-over to the normal control mode is performed out of the predetermined vehicle-speed region, and in the predetermined vehicle-speed region, the switch-over to the normal control mode is performed under the recovery condition in which the vehicle is halted.

A sixth aspect of the present invention is featured by, in the fourth or fifth aspect, that when the vehicle speed is higher than an upper-limit vehicle speed preliminarily determined, the switch-over to the normal control mode is inhibited.

A seventh aspect of the present invention is featured by, in the fourth to sixth aspects, that when the acceleration is larger or greater than a predetermined acceleration, the switch-over to the normal control mode is inhibited.

A eighth aspect of the present invention is featured by, in the second to seventh aspects, that the drive force is calculated based on a drive-force map including the vehicle speed and an accelerator-opening.

A ninth aspect of the present invention is featured by, in the first to eighth aspects, that the shift operation detection is executed by at least two sensors, and when recovery of the shift operation detection from the failed state to the normal state is determined in response to detection signal voltages from the sensors, the range switching means is switched from the fail-safe mode to the normal control mode in synchronism with the shift operation of the driver.

A tenth aspect of the present invention is featured by, in the first to ninth aspects, that the fail-safe mode in the failure of the shift operation detection is to switch a shift range to a neutral range.

A eleventh aspect of the present invention is featured by, in the first to tenth aspects, that a shift lever operatively shifted by the driver is a momentary type lever.

A twelfth aspect of the present invention is featured by, in the eleventh aspect, that when the shift lever is pressedly operated, the switch-over to the normal control mode is inhibited.

According to the shift control device for a vehicle of the first aspect, when the shift operation detection is recovered from a failed state to a normal state and the range switching means is switched from the fail-safe mode to a normal control mode, a recovery condition for determining switching of the fail-safe mode to the normal control mode is altered depending on the vehicle state. This makes it possible to perform switch-over to the normal control mode under a running state of the vehicle with suppressing the variation in the drive force during the switch-over on the basis of the recovery condition.

According to the shift control device for a vehicle of the second aspect, the vehicle state detected by the vehicle state detecting means includes a drive force, a vehicle speed or acceleration. Accordingly, detecting the drive force, the vehicle speed or the acceleration allows the recovery condition to be suitably altered. Thus, the switch-over to the normal control mode is executed under the running state of the vehicle with suppressing the variation in the drive force during the switch-over.

According to the shift control device for a vehicle of the third aspect, the vehicle state where a variation in the drive force is large the recovery condition is made stricter than that in the vehicle state where the variation in the drive force is small upon switch-over to the normal control mode. In the vehicle state where for instance variation in drive force is large, the recovery condition for the normal control mode is made strict. Thus, the fail-safe mode is less likely switched to the normal control mode, thereby preventing the variation in drive force against the driver's intention that would otherwise occur upon switch-over to the normal control mode. In addition, in the vehicle state where variation in drive force is small, the fail-safe mode can be easily switched to the normal control mode. Thus, the normal control mode can be switched under the running state of the vehicle with suppressing the variation in drive force caused against the driver's intention.

According to the shift control device for a vehicle of the fourth aspect, a predetermined vehicle-speed region in which the variation in the drive force becomes large upon switch-over to the normal control mode is preliminarily determined, the switch-over to the normal control mode is performed out of the predetermined vehicle-speed region, and in the predetermined vehicle-speed region, the switch-over to the normal control mode is performed under the recovery condition including at least one of a turn-off operation of an accelerator pedal and a turn-on operation of a brake pedal.

With such operation, when the vehicle state is out of the predetermined vehicle-speed region, there is no relative increase in the variation in drive force occurring upon switch-over to the normal control mode, performing switch-over to the normal control mode under the running state of the vehicle. In contrast, when the vehicle state is in the predetermined vehicle-speed region, no switch-over to the normal control mode is performed and the fail-safe mode is continuously executed, unless the recovery condition is established including at least one of the turn-off operation of the accelerator pedal and the turn-on operation of the brake pedal. Thus, the switch-over to the normal control mode is executed under the running state of the vehicle with suppressing the variation in drive force caused upon switch-over to the normal control mode.

According to the shift control device for a vehicle of the fifth aspect, the predetermined vehicle-speed region in which the variation in the drive force is large upon switch-over to the normal control mode is preliminarily determined, the switch-over to the normal control mode is performed out of the predetermined vehicle-speed region, and in the predetermined vehicle-speed region, the switch-over to the normal control mode is performed under the recovery condition in which the vehicle is halted. With such a recovery condition, when the vehicle state is out of the predetermined vehicle-speed region, there is no relative increase in the variation in drive force occurring upon switch-over to the normal control mode, performing switch-over to the normal control mode under the running state of the vehicle. In contrast, when the vehicle state falls in the predetermined vehicle-speed region, no switch-over to the normal control mode is performed and the fail-safe mode is continuously executed, unless the vehicle is halted. Thus, the variation in drive force occurring upon switch-over to the normal control mode can be suppressed.

According to the shift control device for a vehicle of the sixth aspect, when the vehicle speed is higher than an upper-limit vehicle speed preliminarily determined, the switch-over to the normal control mode is inhibited. Therefore, a rapid deceleration caused by the engine braking occurring upon switch-over to the normal control mode can be prevented.

According to the shift control device for a vehicle of the seventh aspect, when the acceleration is greater than a predetermined acceleration, the switch-over to the normal control mode is inhibited. This makes it possible to perform switch-over to the normal control mode under a state condition of the vehicle state.

According to the shift control device for a vehicle of the eighth aspect, the drive force is calculated based on a drive-force map including the vehicle speed and an accelerator-opening. This makes it possible to estimate the variation in drive force occurring upon switch-over to the normal control mode with increased precision depending on the drive force obtained upon calculation. Thus, the switch-over to the normal control mode can be performed during running of the vehicle with suppressing the variation in drive force occurring upon switch-over to the normal control mode.

According to the shift control device for a vehicle of the ninth aspect, the shift operation detection is executed by at least two sensors, and when recovery of the shift operation detection from the failed state to the normal state is determined in response to detection signal voltages from the sensors, the range switching means is switched from the fail-safe mode to the normal control mode in synchronism with the shift operation of the driver. With such a determination, the shift operation of the driver and switch-over to the normal control mode can be synchronously performed with each other, thereby preventing the vehicle from running against the driver's intention.

According to the shift control device for a vehicle of the tenth aspect, the fail-safe mode in the failure of the shift operation detection is to switch a shift range to a neutral range. This prevents the vehicle from running against the driver's intention in the failure state, thereby halting the vehicle in safe.

According to the shift control device for a vehicle of the eleventh aspect, a shift lever operatively shifted by the driver is a momentary type lever. This makes it impossible for the driver to determine the shift range in terms of the shift range. Consequently, establishing the neutral range as the fail-safe prevents the vehicle from running against the driver's intention.

According to the shift control device for a vehicle of the twelfth aspect, when the shift lever is pressedly operated, the switch-over to the normal control mode is inhibited. Therefore, under a condition where the shift lever is pressed down, the fail-safe mode is continued and the switch-over to the normal control mode is not executed, unless the shift lever is returned to a momentary home position once. Accordingly, the vehicle from running against the driver's intention can be prevented.

DETAILED DESCRIPTION OF THE PREFERRED EMBODIMENTS

Figure 1:
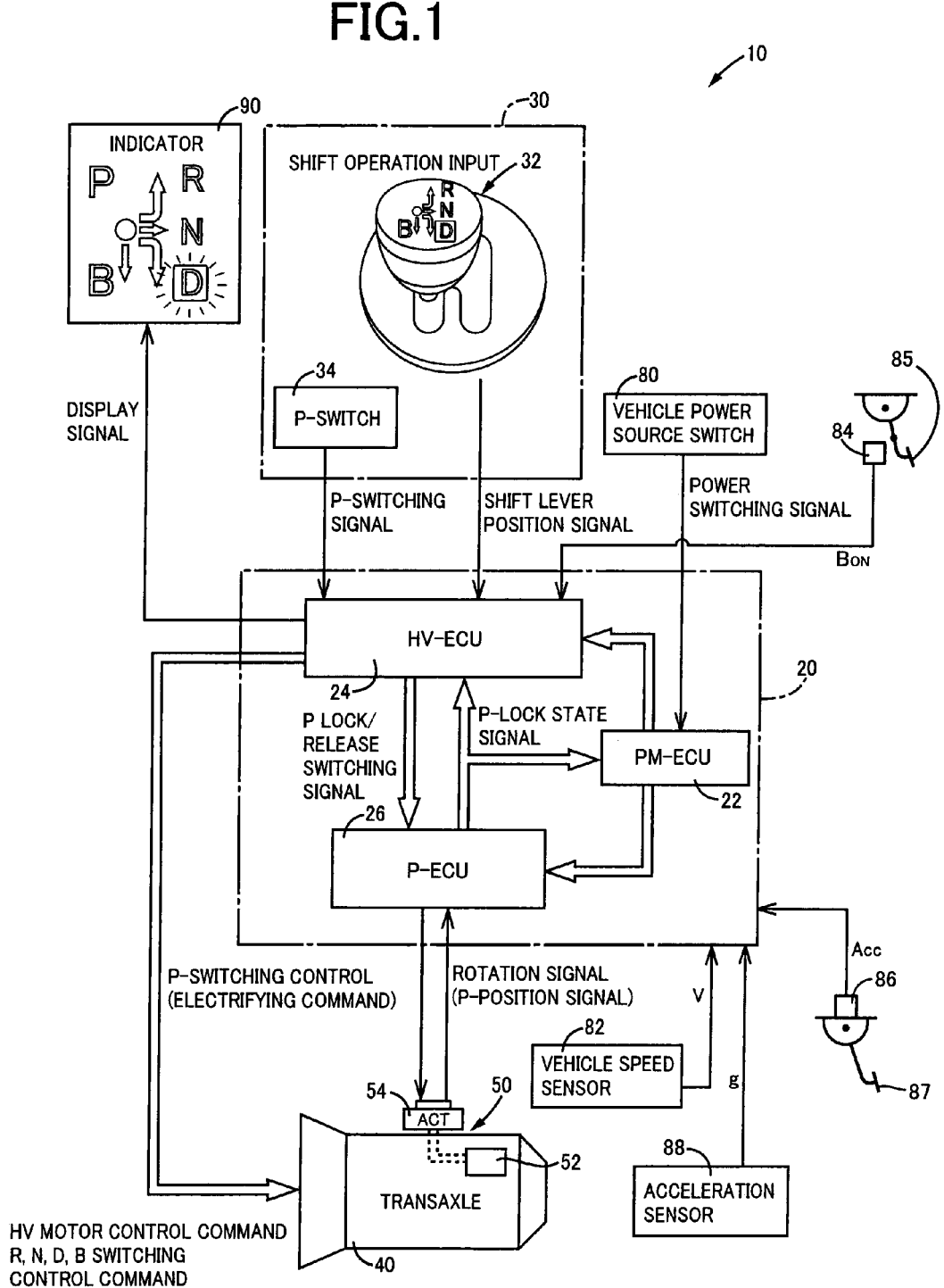
FIG. 1 is a view illustrating an outline structure of a shifting control device for vehicle to which the present invention is applied.

As used herein, preferably, the expression "a recovery condition is strict" corresponds to an additional condition under which during a switch-over to a normal control mode, the switch-over to the normal control mode not is made unless a condition is established including at least one of, for instance, a turn-off operation of an accelerator pedal and a turn-on operation of a brake pedal.

Further, preferably, a region in which the variation in drive force exceeds a predetermined value preliminarily determined, belongs to a low vehicle-speed region and a vehicle speed region in which the variation in drive force becomes less than the predetermined value, belongs to a medium and high vehicle-speed region. That is, for the low vehicle-speed region, the variation in drive force becomes large with respect to a depressing stroke of the accelerator pedal. Therefore, setting the recovery condition to be strict for the low vehicle-speed region to switch a fail-safe mode to the normal control mode prevents the occurrence of variation in drive force against the driver's intention.

Furthermore, preferably, in a type in which a momentary lever is shifted along one axis, at least two sensors including a main sensor and a sub sensor with a function to monitor the main sensor are required. Moreover, in another momentary lever configured to be two-dimensionally shifted, a main shift sensor and a main select sensor for detecting shift operations oriented in vertical and lateral directions are required. This makes it necessary to prepare a sub shift sensor and a sub select sensor having functions to monitor the respective main sensors, resulting in need to prepare at least four sensors.

Moreover, preferably, the expression "turn-off operation of the accelerator pedal" is defined to represent an operation in which no accelerator pedal is depressed and the expression "turn-on operation of the brake pedal" is defined to represent an operation in which the brake pedal is depressed.

More preferably, further, the transmission may have structures of either one of structures described below. Firstly, the transmission may be a variety of planetary-gear type multi-step transmissions with for instance a forward drive four-speed gear positions, a forward drive five-speed gear positions, a forward drive six-speed gear positions and more gear positions. In these transmissions, rotary elements of plural sets of planetary gear devices are selectively coupled by engagement devices such that a plurality of gear positions (shift positions) is alternately established. The transmission may further be a synchronous mesh-type parallel two-shaft transmission including plural pairs of constant-mesh type change gears mounted on two shafts, in which either one of the plural pairs of change gears is alternately brought into a power transmitting state by the action of a synchronous device. The synchronous mesh-type parallel two-shaft transmission may include a hydraulic actuator to drive the synchronous device such that gear positions are automatically switched. The transmission may further include a so-called belt-drive type continuously variable transmission having a power transmitting belt serving as a power transmitting member, which is wound in tension between a pair of variable pulleys having variable effective diameters to vary speed ratios in a continuously variable fashion.

Secondly, the transmission may be a so-called traction type continuously variable transmission having a pair of cones arranged to rotate about a common axis, and plural pieces of rollers operative to rotate about a center of rotation intersecting the common axis. The rollers are pinched between the pair of cones, and an intersecting angle between the center of rotation of the rollers and the common axis is varied to vary the speed ratios.

Thirdly, the transmission may be an automatic transmission including a differential mechanism structured of for instance a planetary gear unit arranged to distribute a drive power from an engine to a first electric motor and an output shaft, a second electric motor mounted on the differential mechanism at an output shaft thereof. With such an automatic transmission, the differential mechanism has a differential action which mechanically transmits a main part of the drive power of the engine to drive wheels. The rest of the drive power from the engine is electrically transmitted through the first electric motor to a second electric motor in an electrical path, thereby electrically varying the speed ratios. In another alternative, the transmission may be an automatic transmission including an electric motor capable of transmitting a drive power to an engine shaft and an output shaft, which is installed on a so-called parallel shaft type hybrid vehicle.

Now, the present invention will be described below in detail with reference to various embodiments shown in the accompanying drawings. The embodiments described below are suitably simplified or modified in structure with none of various component parts being necessarily drawn in dimensional ratio and shape or the like in accurate manners.

Embodiment 1

FIG. 1 is a view illustrating an outline structure of a shifting control device for vehicle (hereinafter referred to as a "shifting control device") 10 to which the present invention is applied. The shifting control device 10 includes an electronic control section 20, a shift operation device 30, a driving device 40 and a parking lock device 50, etc., and functions as a shifting control device of a shift-by-wire system to switch shifting positions (shift positions or shift ranges) of the driving device 40 by electric control. Hereunder, description will be provided of an exemplary case with the shifting control device 10 of the present invention applied to the driving device 40 preferably used for a hybrid vehicle including a drive-force source comprised of an engine and an electric motor. However, the vehicle, to which the shifting control device 10 of the present invention is applied, may be vehicles of various types such as a usual engine-propelled vehicle, a hybrid vehicle and an electric vehicle, etc.

The electronic control section 20 has a structure including a so-called microcomputer comprised of a CPU, a ROM, a RAM and input and output interfaces, etc. Signal processing executed in accordance with programs preliminarily stored in the ROM with utilizing a temporarily storing function of the RAM executes a drive control such as a hybrid drive control or the like related to the engine (not shown) and the electric motor incorporated in the driving device 40, and a switching control for switching shift ranges in the driving device 40 by using the shift-by-wire system.

The electronic control section 20 is applied with various signals including: positional signals delivered from shift sensors 36 and 37 and select sensors 38 and 39, acting as position sensors for detecting an operated position (shift position) $P_{SH}$ of for instance a shift lever 32, depending on the shift position $P_{SH}$ of the shift lever 32; a P-switching signal representing a switching operation of a P-switch 34 operable by a driver for switching the shift range of the driving device 40 between a parking range (P-range) and non-P-ranges except the P-range; and a P-position signal representing an operating state of a parking lock in the parking lock device 50, actuated when the parking lock is operated or released, for switching the shift range of the driving device 40 between the P-range and the non-P-ranges.

The electronic control section 20 is further applied with other signals including: a power switching signal representing a switching operation of a vehicle power source switch 80 operable by the driver for switching a vehicle power source in a turn-on state (vehicle power source TURN-ON, ignition ON) and a turn-off state (vehicle power source TURN-OFF, ignition OFF); a vehicle signal representing a vehicle speed V delivered from a vehicle speed sensor 82 and corresponding to an output rotation speed of the driving device 40; a brake operation signal from a brake switch 84 to represent a foot brake operation $B_{ON}$ of a foot brake pedal 85; an accelerator opening signal delivered from an accelerator opening sensor 86 to represent an accelerator opening $A_{CC}$ corresponding to an operation amount (depressed amount) of an accelerator pedal 87; and an acceleration signal delivered from a vehicle acceleration sensor 88 to represent a vehicle acceleration g, and the like.

Further, the electronic control section 20 outputs various output signals including: an engine-output control command signal for controlling for instance an engine output; a hybrid-motor control command signal for commanding the electric motor in the driving device 40 to operate; a shift-range switching control command signal for switching the shift ranges in the driving device 40; a shift-range display control command signal operative to activate an indicator (shift range display device) 90 to display a switched state of the shift ranges in the driving device 40, and a parking-lock display control command signal for displaying a parking lock state, etc.

More particularly, the electronic control section 20 includes a power-source control computer (hereinafter referred to as a "PM-ECU") 22, a hybrid control computer (hereinafter referred to as a "HV-ECU") 24, and a parking control computer (hereinafter referred to as "P-ECU") 26, etc.

The PM-ECU 22 switches the vehicle power source between the vehicle power source TURN-ON and the vehicle power source TURN-OFF for instance in response to a power switching signal delivered from the vehicle power source switch 80 operated by the user. Upon detecting the power switching signal being input with the vehicle power source TURN-OFF for instance the PM-ECU 22 turns on a relay (not shown), operative to switch the vehicle power source TURN-ON and the vehicle power source TURN-OFF, upon which the vehicle power source TURN-ON is established. Further, upon detecting a vehicle speed V falling not more than a given vehicle speed V' and the power switching signal being input with the vehicle power source TURN-ON, the PM-ECU 22 turns off the relay upon which the vehicle power source TURN-OFF is established. In addition, when a P-lock state signal delivered from the P-ECU 26 with the vehicle power source TURN-OFF represents the parking lock device 50 with the parking lock remained in a released state, the PM-ECU 22 outputs a signal to the P-ECU 26 for compelling the parking lock to be activated in the parking lock device 50 to switch the shift range to a P-range (such sequence operations being referred to as "auto-P operation").

The HV-ECU 24 for instance performs an overall control of an operation of the driving device 40. For instance, the HV-ECU 24 detects a brake operation signal representing the foot-brake operation $B_{ON}$ being input when the PM-ECU 22 switches the vehicle power source TURN-OFF to the vehicle power source TURN-ON. Then, the HV-ECU 24 start-up a hybrid system for the vehicle running, and outputs a hybrid motor control command related to the vehicle running to the driving device 40 for controlling the vehicle running. Moreover, the HV-ECU 24 outputs a shift range switching control command in response to the positional signals, depending on the shift position $P_{SH}$ delivered from the shift sensor 36 and the select sensor 38 to the driving device 40 for thereby switching the shift ranges. In addition, the HV-ECU 24 outputs the P-switching signal to the P-ECU 26 for switching the shift range between the P-range and the non-P-range in the driving device 40 in response to the P-switching signal delivered from the P-switch 34. Besides, the HV-ECU 24 outputs the display signal for displaying state of the shift range to the indicator 90 which indicates the state of the shift range based on the indication signal output from to the HV-ECU 24.

For switching the shift range between the P-range and the non-P-range in response to the P-switching signal delivered from for instance the HV-ECU 24, the P-ECU 26 controllably drives the parking lock device 50 for operating or releasing the parking lock. Further, the P-ECU 26 determines in response to the P-position signal delivered from the parking lock device 50 and representing an activated state of the parking lock, as to whether the shift range of the driving device 40 remains in the P-position or the non-P-position. The determined result is output as a P-lock state signal to the PM-ECU 22.

Figure 2:
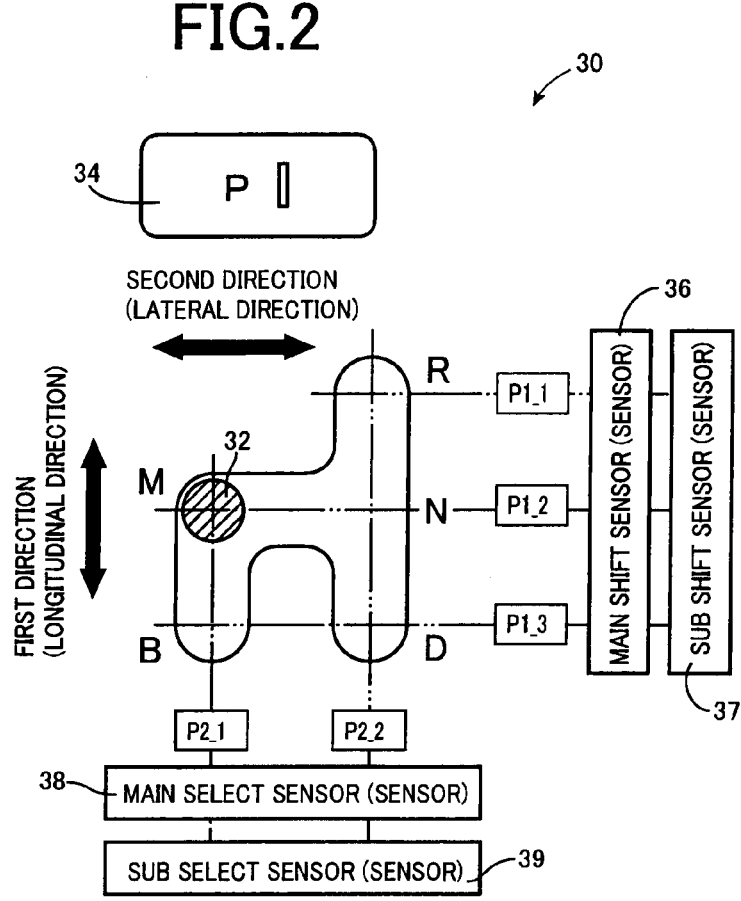
FIG. 2 is a graph showing one example of a shift operation device in the form of a switching device arranged to switch a plural kinds of shift ranges in a transmission by a manual operation.

FIG. 2 is a view illustrating one example of the shift operation device 30 acting as a switching device for switching plural kinds of shift ranges in the driving device 40 by a manual operation. The shift operation device 30, mounted in an area close proximity to for instance a driver's seat, includes a shifting lever 32 structured in the form of a momentary type operatively movable to a plurality of shift positions $P_{SH}$, i.e., an automatic return type as the operating lever automatically returned to an original position (initial position) with release of the operating force. Further, the shift operation device 30 of the present embodiment includes a P-switch 34, mounted as an independent switch in an area close proximity to the shift lever 32, for switching the shift range of the driving device 40 to the parking range (P-range) for the parking lock.

The shift lever 32 has an arrangement to be operable to three shift positions $P_{SH}$, arranged in a fore and aft direction or a vertical direction, i.e., a longitudinal direction of the vehicle as shown in FIG. 2, which includes a position "R" (R-position), a position "N" (N-position) and a position "D" (D-position), and a position "M" (M-position) and a position "B" (B-position) arrayed in parallel to a layout of the former three positions. Thus, the positional signal is output to the HV-ECU 24 depending on the shift positions $P_{SH}$. Further, the shift lever 32 can be operated in the longitudinal direction to one of the R-position, the N-position and the D-position, can be operated in the longitudinal direction between the M-position and the B-position, and can be operated in a lateral direction of the vehicle intersecting the longitudinal direction thereof to have one of the N-position and the B-position.

The P-switch 34 is for instance a momentary type pushbutton switch, which outputs the P-switching signal to the HV-ECU 24 in each depression by the driver. If the P-switch 34 is depressed with the shift range of the driving device 40 switched in for instance the non-P-range and the foot brake depressed, the P-ECU 26 causes the shift range to switch to the P-range in response to a P-switching signal delivered from the HV-ECU 24, provided that a predetermined condition such as the vehicle remained under a halted condition is satisfied. The P-range represents a parking range in which the parking lock is performed by a power transmitting path being interrupted in the driving device 40 and the parking lock device 50 mechanically blocks the drive wheels from rotating.

The M-position of the shift operation device 30 represents an initial position (home position) of the shift lever 32. Even if the shift lever 32 is shifted to the shift positions $P_{SH}$ (the positions "R", "N", "D" and "B") other than the M-position, it is returned to the M-position by the action of a mechanical mechanism such as a spring or the like, when the user releases the shift lever 32, i.e., when an external force, acting on the shift lever 32, is removed. With the shift operation device 30 operatively shifted to each shift position $P_{SH}$, the HV-ECU 24 allows the shift range to be switched to a shift range associated with the shift position $P_{SH}$ subsequent to the shift operation in response to the shift position $P_{SH}$ (positional signal). In addition, the indicator 90 displays the current shift position $P_{SH}$, i.e., a state of the shift range in the driving device 40.

Description will be provided of the various shift ranges. The R-range, selected when the shift lever 32 is operated to the position "R", represents a reverse-drive running range in which a drive force is transmitted to the drive wheels to drive the vehicle in a reverse direction. Further, the neutral range (N-range), selected when the shift lever 32 is operated to the position "N", represents a neutral range to establish a neutral state under which the power transmitted path is interrupted in the driving device 40. Furthermore, the D-range, selected when the shift lever 32 is operated to the position "D", represents a forward-drive running range in which a drive force is transmitted to the drive wheels 38 to drive the vehicle in a forward direction. If the shift range is switched to for instance the P-range, the HV-ECU 24 determines that the shift operation is executed to a predetermined shift position $P_{SH}$ (particularly, the position "R", the position "N" or the position "D") for releasing a halted movement (in a parking lock) of the vehicle. Then, the HV-ECU 24 outputs a P-switching signal to the P-ECU 26 for releasing the parking lock. A P-switching control command signal is output from the P-ECU 26 to the parking lock device 50 in response to the P-switching signal delivered from the HV-ECU 24 for releasing the parking lock. Then, the HV-ECU 24 allows the shift range to be switched to a shift range associated with a shift position $P_{SH}$ subsequent to such a shift operation.

Further, the B-range, selected when the shift lever 32 is operated to the position "B", represents a reduced-speed forward-drive running range (engine braking range), for instance by causing the electric motor to generate regenerative torque in the D-range, to provide an engine braking effect for reducing rotation of the drive wheels. Accordingly, even if the shift lever 32 is operatively shifted to the position "B" from the current shift range other than the D-range, the HV-ECU 24 causes such a shift operation to be ineffective. The shift operation to the position "B" is caused effective only when in the current shift range is the D-range. For instance, even if the driver performs the shift operation to the position "B" from the P-range, the shift range is remained in the P-range.

In the shift operation device 30 of the present embodiment, the shift lever 32 is returned to the position "M" in the removal of an external force acting thereon. Thus, a mere visual contact with the shift position $P_{SH}$ of the shift lever 32 can not recognize the shift range being selected. Therefore, the indicator 90 is located in a position to be easily visible for the driver to display such information inclusive of the sift range being selected in the P-range.

The shift operation device 30 of the present embodiment adopts the so-called shift-by-wire to be operated in two-dimensional directions including the first direction aligned in the longitudinal direction, and the second direction in line with the lateral direction intersecting with (orthogonal to in FIG. 2) the first direction. Accordingly, for the shift position $P_{SH}$ to be output to the electronic control section 20 as a detection signal of the position sensor, there are provided the main shift sensor 36 and the sub shift sensor 37 acting as a first detecting section for detecting the shift operation in the first direction, and the main select sensor 38 and the sub select sensor 39 acting as a second detecting section for detecting the shift operation in the second direction.

Voltages as the detection signals (positional signals) are output from both of the main shift sensor 36 and the main select sensor 38 to the electronic control section 20 depending on the shift position $P_{SH}$. Then, the electronic control section 20 recognizes (determines) the shift position $P_{SH}$ based on such detection signal voltages. That is, it can be said that the first detecting section (main shift sensor 36) and the second detecting section (main select sensor 38) form a shift position detecting section as a whole to detect the shift position $P_{SH}$ of the shift operation device 30. The sub shift sensor 37 and the sub select sensor 39, functioning as the monitors for the main shift sensor 36 and the main select sensor 38, output voltage as the detection signal (positional signal) corresponding to the shift position $P_{SH}$ to the electronic control section 20. The electronic control section 20 can recognize (determine) the shift position $P_{SH}$ based on the detection signal.

Figure 3:
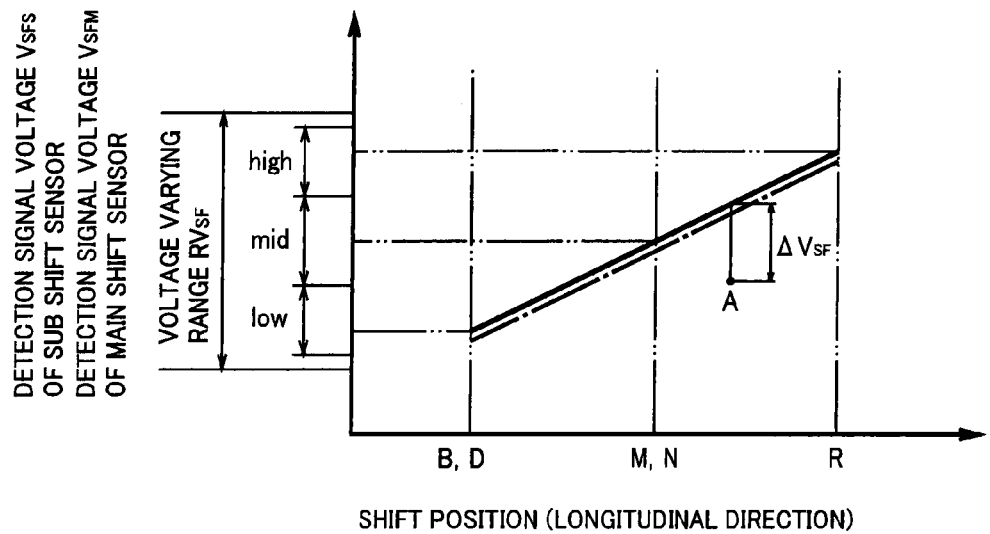
FIG. 3 is a view showing the relationship between a longitudinally extending shift position of a shift operation device and a detection signal voltage of a shift sensor incorporated in the shift operation device.

To describe one example of recognition of the shift position $P_{SH}$, the main shift sensor 36 provides a detection signal voltage $V_{SFM}$ as shown by a solid line in FIG. 3. The detection signal voltage $V_{SFM}$ takes various voltages including: a voltage falling in a low range in the presence of the shift position $P_{SH}$ in the longitudinal direction (first direction) switched to the position "B" or "D"; a voltage falling in a med range higher than that of the low range in the presence of the position "M" or "N"; and a voltage falling in a high range higher than that of the med range in the presence of the position "R". The sub shift sensor 37 provides a detection signal voltage $V_{SFS}$ as shown by one-dot line in FIG. 3. The detection signal voltage $V_{SFS}$ takes various voltages including: a voltage falling in a low range in the presence of the shift position $P_{SH}$ in the longitudinal direction (first direction) switched to the position "B" or "D"; a voltage falling in a med range higher than that of the low range in the presence of the position "M" or "N"; and a voltage falling in a high range higher than that of the med range in the presence of the position "R".

Figures 4, 5:
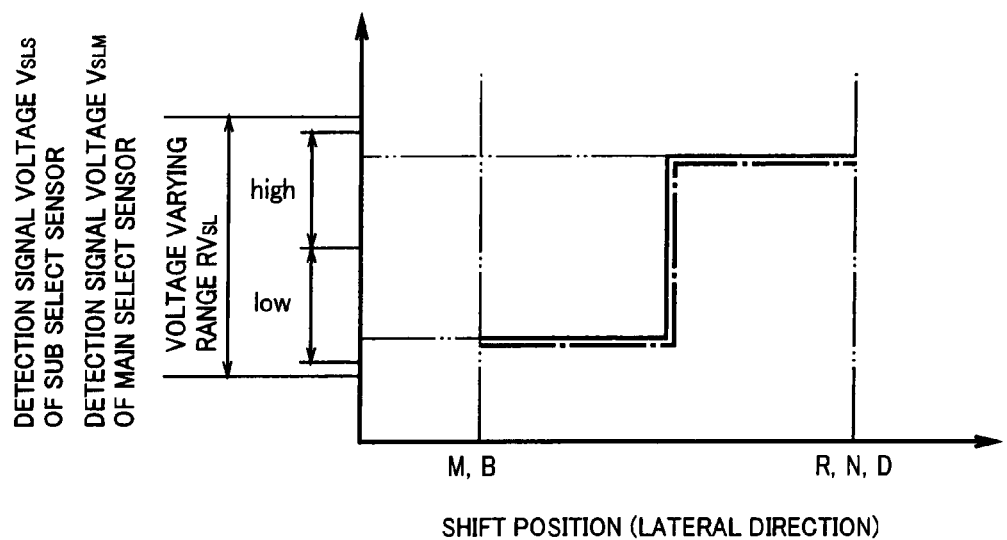
FIG. 4 is a view showing the relationship between a laterally extending shift position of the shift operation device shown in FIG. 2, and a detection signal voltage of a select sensor incorporated in the shift operation device.
FIG. 5 is a view illustrating a correlation between combination of the detection signal voltages of the shift sensor and the select sensor, and the shift positions.

Further, as shown by a solid line in FIG. 4, the detection signal voltage $V_{SLM}$ of the main select sensor 38 takes various voltages, which includes: a voltage falling in a low range in the presence of the shift position $P_{SH}$ relevant to the lateral direction (second direction) switched to the position "M" or "B"; and a voltage falling in a high range higher than that of the low range in the presence of the position "R", "N" or "D". The detection signal voltage $V_{SLS}$ of the sub select sensor 39 takes various voltages as shown by one-dot line, which includes: a voltage falling in a low range in the presence of the shift position $P_{SH}$ relevant to the lateral direction (second direction) switched to the position "M" or "B"; and a voltage falling in a high range higher than that of the low range in the presence of the position "R", "N" or "D".

The HV-ECU 24 detects the varying detection signal voltages $V_{SFM}$ and $V_{SFS}$ (expressed as $V_{SF}$ unless they are otherwise distinguished from each other), and the varying detection signal voltages $V_{SLM}$ and $V_{SLS}$ (expressed as $V_{SL}$ unless they are otherwise distinguished from each other). As shown in a diagram shown in FIG. 5, the HV-ECU 24 recognizes that: if "$V_{SF}$=mid and $V_{SL}$=high", the shift position $P_{SH}$ is switched to the position "N"; if "$V_{SF}$=high and $V_{SL}$=high", the shift position $P_{SH}$ is switched to the position "R"; if "$V_{SF}$=low and $V_{SL}$=high", the shift position $P_{SH}$ is switched to the position "D"; if "$V_{SF}$=mid and $V_{SL}$=low", the shift position $P_{SH}$ is switched to the position "M"; and if "$V_{SF}$=low and $V_{SL}$=low", the shift position $P_{SH}$ is switched to the position "B". In FIG. 3, further, although the various ranges such as the range "low", the range "mid" and the range "high" are continuous, these ranges may have a dead band that disenables a determination. In addition, properties of the detection signal voltage $V_{SF}$ of the select sensor 38, i.e., characteristics ranging from "low" to "high" relative to the shift position $P_{SH}$ in the lateral direction may vary from "high" to "low" oppositely.

Thus, the shift position $P_{SH}$ is recognized by the HV-ECU 24. However, to prevent the occurrence of erroneous operation and erroneous recognition (determination) or the like, the shift range is not immediately switched to the shift range associated with the shift position $P_{SH}$ subsequent to the shift operation even when the shift operation establishes such a shift position $P_{SH}$. Predetermined range fixing times (shift operation fixing times) are preliminarily set for respective shift positions $P_{SH}$ or respective shift ranges. For instance, if the shift lever 32 remains at the shift position $P_{SH}$ subsequent to the shift operation for a time period, i.e., a residence time exceeding the predetermined range fixing time, the HV-ECU 24 allows such a shift operation to be fixed for switching to the shift range associated with the shift position $P_{SH}$ subsequent to the shift operation. Description will be provided of an exemplary case where the shift range is switched from the P-range to the N-range. When the position "M" is switched to the position "N" with the shift range remained in the position "P", the staying time of the shift lever 32 in the position "N" exceeds a neutral range fixing time representing the predetermined range fixing time for fixing the shift operation to the position "N". Then, the HV-ECU 24 fixes (determines) that the shift position $P_{SH}$ subsequent to the shift operation is the position "N", thereby switching the P-range to the N-range in the driving device 40.

When both the shift sensors 36 and 37 (which will be referred to as "shift sensors 36 and 37" unless otherwise specified as "a main shift sensor 36 and a sub shift sensor 37") and the select sensors 38 and 39 (which will be referred to as "select sensors 38 and 39" unless otherwise specified as "a main select sensor 38 and a sub select sensor 39") are normal, the shift ranges are switched in a manner described above. That is, the switching to another shift range associated with the shift position $P_{SH}$ is performed in response to detection signal voltages delivered from the shift sensors 36 and 37 and the select sensors 38 and 39. In contrast, if a failure occurs in one of the shift sensors 36 and 37 and the select sensors 38 and 39, the shift range is likely switched to another shift range against the driver's intention. To prevent such an issue, the failures of various positional sensors (the shift sensors 36 and 37 and the select sensors 38 and 39) are sequentially detected.

For instance, the failures or abnormality (troubles, failing, etc.) caused by wiring disconnections or short-circuiting, etc., of the shift sensors 36 and 37 and the select sensors 38 and 39 are detected. To this end, voltage varying ranges $RV_{SF}$ and $RV_{SL}$ (see FIGS. 3 and 4), involved in respective ranges of detection signal voltages $V_{SF}$ and $V_{SL}$ for all of the shift positions $P_{SH}$ are preliminarily set on experimental tests in respect of the shift sensors 36 and 37 and the select sensors 38 and 39, respectively. If the detection signal voltages $V_{SF}$ and $V_{SL}$ are deviated from the voltage varying ranges $RV_{SF}$ and $RV_{SL}$, then, the electronic control section 20 (HV-ECU 245)

determines the failure occurrence in the relevant positional sensor (either one of the shift sensors 36 and 37 and the select sensors 38 and 39).

Aside from the failures of the positional sensors where the detection signal voltages $V_{SF}$ delivered from the shift sensors 36 and 37 are deviated from the voltage varying ranges $RV_{SF}$, a determination is made on another failure. That is, even though the detection signal voltage $V_{SF}$ falls in the voltage varying range $RV_{SF}$, a voltage difference $\Delta V_{SF}$ may be present between, for instance, a detection signal voltage $V_{SFM}$ of the main shift sensor 36 and a detection signal voltage $V_{SFS}$ of the sub shift sensor 37. If such a voltage difference exceeds a predetermined value preliminarily determined, the failure occurrence in either the main shift sensor 36 or the sub shift sensor 37 is determined. In FIG. 3, for instance, when the detection signal voltage $V_{SFM}$ of the main shift sensor 36 temporarily takes a state A, and the voltage difference $\Delta V_{SF}$ becomes greater than a predetermined value $\alpha$, failure is determined. As set forth above, when the voltage difference $\Delta V_{SF}$ exceeds the predetermined value $\alpha$, one of the detection signal voltages $V_{SFM}$ and $V_{SFS}$ does not take a voltage value associated with the shift operation of the driver. Thus, the failure occurrence in one of the main shift sensor 36 and the sub shift sensor 37 is determined. Thus, as set forth above, even when the main shift sensor 36 remains to be normal and the failure occurs in the sub shift sensor 37, the failure is determined.

Likewise, further, aside from the failures of the positional sensors where the detection signal voltages $V_{SL}$ delivered from the select sensors 38 and 39 are deviated from the voltage varying ranges $RV_{SL}$, a determination is made on another failure. That is, even though the detection signal voltage $V_{SL}$ falls in the voltage varying range $RV_{SL}$, a voltage difference $\Delta V_{SL}$ may be present between, for instance, a detection signal voltage $V_{SLM}$ of the main select sensor 38 and a detection signal voltage $V_{SLS}$ of the sub select sensor 39. If such a voltage difference exceeds a predetermined value $\beta$, the failure occurrence in either the main select sensor 38 or the sub select sensor 39 is determined. In addition, even when the main select sensor 38 remains to be normal and the failure occurrence in the sub select sensor 39, failure is determined.

Upon detection of the failure in the positional sensor (any of the shift sensors 36 and 37 and the select sensors 38 and 39), the electronic control section 20 switches a running mode to a fail-safe mode. If the failure of the positional sensor is detected during for instance running of the vehicle, the electronic control section 20 switches the shift range of the drive apparatus 40 to an "N" range as the fail-safe mode. If the failure occurs in the positional sensor, the shift operation of the driver can not be discriminate, so that the shift range is likely to be switched to another shift range that is against the driver's intention. To prevent such an issue, the shift range may be preferably switched to the "N" range to halt the vehicle for safety.

As shown in FIG. 3, meanwhile, the failure occurrence is determined when the voltage difference $\Delta V_{SF}$ between the detection signal voltage $V_{SFM}$ of the main shift sensor 36 and the detection signal voltage $V_{SFS}$ of the sub shift sensor 37 exceeds the predetermined value $\alpha$. In this case, there is likelihood that the failure is of a transient state and immediately recovered to the normal state. That is, the normal state is recovered with the voltage difference $\Delta V_{SF}$ between the detection signal voltages $V_{SFM}$ and $V_{SFS}$ becoming less than the predetermined value $\alpha$. Under a circumstance where the failures occur in the shift sensors 36 and 37 due to for instance interference, conflict in logic and a transient power failure, etc., the normal state is immediately recovered even upon the temporal detection of the failures. Likewise, further, under a circumstance where the failure occurs in any of the main select sensor 38 and the sub select sensor 39 due to interference and conflict in logic, etc., the normal state is immediately recovered. Further, some of the shift sensors are also likely to be recovered during running of the vehicle from a failed state with the detection signal voltages $V_{SF}$ and $V_{SL}$ being deviated from the to the normal state falling in the voltage varying ranges $RV_{SF}$ and $RV_{SL}$. In such likelihood, the positional sensor is recovered to the normal state under the fail-safe mode (in the "N" range). In the conventional art, the vehicle under a running condition is stopped once, and thereafter, the fail-safe mode is switched to the normal control mode.

With the present embodiment, if the failures of the positional sensors (the shift sensors 36 and 37 and the select sensors 38 and 39) are recovered to the normal state during running of the vehicle (in the "N" range under the fail-safe mode), the electronic control section 20 switches the fail-safe mode to the normal control mode even during running of the vehicle. There is likelihood that a failure occurs during running of the vehicle for instance in the "D" range (forward-drive running range) with resultant switch-over to the fail-safe mode (in the "N" range), under which the failed state is recovered to the normal state again during running of the vehicle. In such likelihood, if the shift range is automatically switched to the "D" range, the drive force is likely generated against the driver's intention to cause rapid acceleration on the vehicle. Accordingly, upon determination that the failed state in detecting the shift operation is recovered to the normal state during running of the vehicle under the fail-safe mode, the shift range is switched to the normal control mode in synchronism with the shift operation of the driver. This prevents generation of the drive force against the driver's intention.

Under a circumstance where the failed state is recovered to the normal state during for instance running of the vehicle under the fail-safe mode, the driver is likely to operate the shift lever 32 to the "D" range. In this moment, the variation in the drive force may become large or increase depending on a state of the vehicle, so that the drive force is generated against the driver's intention. In such likelihood, the electronic control section 20 does not execute the switch-over to the normal control mode. For instance, when a vehicle speed V of the vehicle lies in the low vehicle-speed region, the variation in drive force becomes greater than that occurring at the middle and high vehicle-speed region for the same accelerator-opening Acc. Further, if the shift range is switched to the "D" range in the high vehicle speed region, a rapid engine braking is likely generated such that the variation in drive force increases in a decelerating direction. With the present embodiment, the fail-safe mode is switched to the normal control mode in light of a vehicle condition so as to suppress the variation in drive force occurring during the switch-over to the normal control mode.

Figure 6:
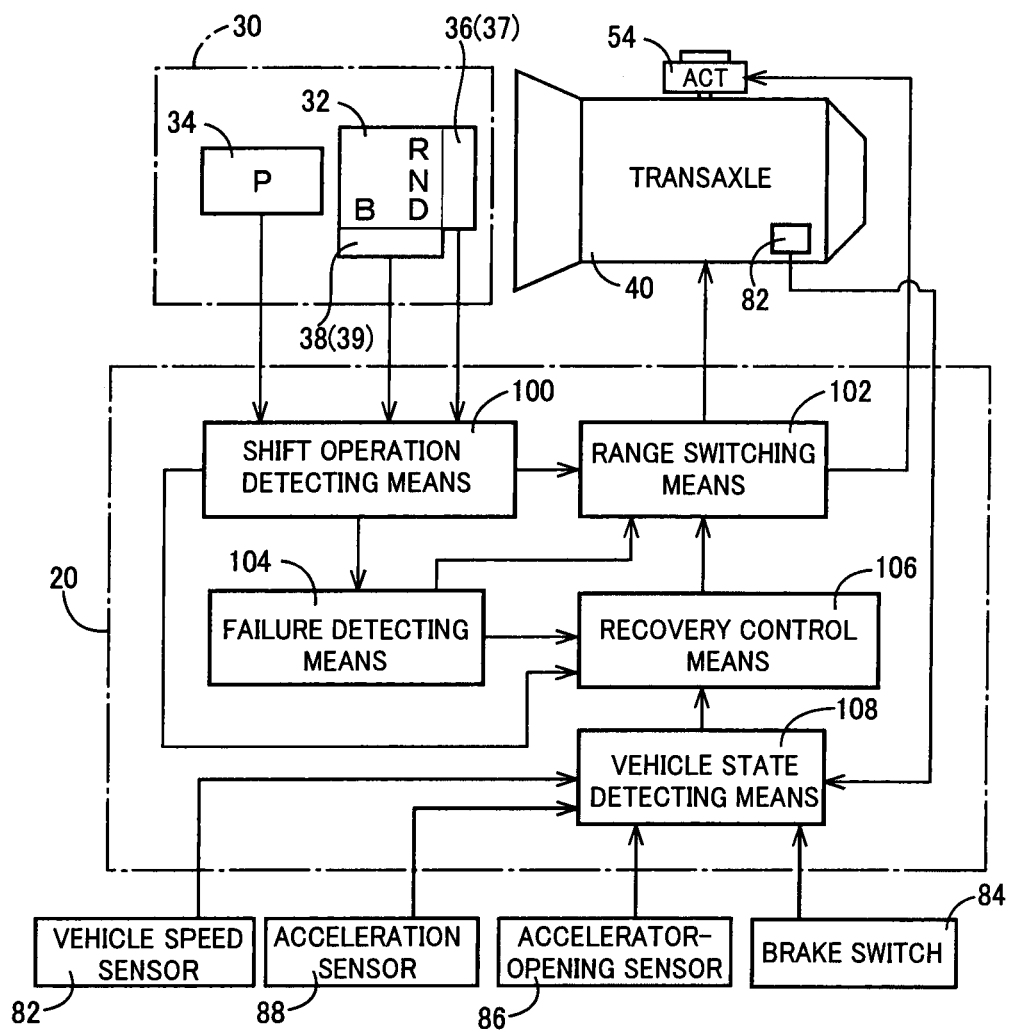
FIG. 6 is a functional block diagram illustrating a major part of a control function of an electronic control section shown in FIG. 1.

FIG. 6 is a functional block diagram illustrating a major part of a control function of a shift control device 10 (electronic control section 20). Shift operation detecting means 100 detects the detection signal voltages $V_{SFM}$ and $V_{SLM}$ delivered from the main shift sensor 36 and the main select sensor 38, thereby electrically detecting the shift operation conducted by the driver. That is, the shift operation conducted by the driver is detected based on a voltage variation of at least one of the detection signal voltages $V_{SFM}$ and $V_{SLM}$. Further, the shift operation detecting means 100 determines the shift position $P_{SH}$ based on operation executed in response to the detection signal voltages $V_{SFM}$ and $V_{SLM}$ detected by the main shift sensor 36 and the main select sensor 38. In addition to such operation, the shift operation detecting means 100 detects the detection signal voltages $V_{SLM}$ and $V_{SLS}$ delivered from the sub shift sensor 37 and the sub select sensor 39 upon which the shift operation is detected based on the detection signal voltages $V_{SLM}$ and $V_{SLS}$.

Furthermore, the shift operation detecting means 100 detects a P switch signal delivered from a P switch 34 upon which a shift operation to a "P" position is detected based on the resulting P switch signal. Moreover, the shift operation detecting means 100 determines if the shift lever 32 remains depressed in a predetermined shift position corresponding to a state under which the shift lever 32 remains fixed to the predetermined shift position for a long period of time.

Range switching means 102 outputs a shift-range switching control command to the drive apparatus 40 in response to the shift position $P_{SH}$ detected by the shift operation detecting means 100, i.e., the shift operation conducted by the driver for switching the shift range. Upon detection of the P switch signal, further, the range switching means 102 allows a P lock motor 54 to actuate a parking lock mechanism (not shown) which is incorporated in the drive apparatus 40, upon which an output rotation member (not shown) operable in conjunction with drive wheels are mechanically locked.

Failure detecting means 104 detects the failures or abnormality (such as troubles and failing) caused by for instance wiring disconnections or short-circuiting, etc., of the various sensors (the shift sensors 36 and 37 and the select sensors 38 and 39) for determining whether the detection signal voltages $V_{SF}$ and $V_{SL}$ fall in regions of the voltage varying ranges $RV_{SF}$ and $RV_{SL}$ (see FIGS. 3 and 4). If the detection signal voltages $V_{SF}$ and $V_{SL}$ are deviated from the voltage varying ranges $RV_{SF}$ and $RV_{SL}$, then, failure of these positional sensors (the shift sensors 36 and 37 and the select sensors 38 and 39) is determined.

Further, the failure detecting means 104 calculates the voltage difference $\Delta V_{SF}$ between the detection signal voltage $V_{SFM}$ of the main shift sensor 36 and the detection signal voltage $V_{SFS}$ of the sub shift sensor 37 for determining whether the resulting voltage difference $\Delta V_{SF}$ exceeds the predetermined value $\alpha$. If the voltage difference $\Delta V_{SF}$ exceeds the predetermined value $\alpha$, then, a failure occurrence in either one of the main shift sensor 36 and the sub shift sensor 37 is determined. Furthermore, the predetermined value $\alpha$ is preliminarily acquired on experimental tests and calculation and set to a threshold value representing a voltage difference regarded to cause the failure. Likewise, the failure detecting means 104 calculates the voltage difference $\Delta V_{SL}$ between the detection signal voltage $V_{SLM}$ of the main select sensor 38 and the detection signal voltage $V_{SLS}$ of the sub select sensor 39 to determine whether the resulting voltage difference $\Delta V_{SL}$ exceeds the predetermined value $\beta$. If the voltage difference $\Delta V_{SL}$ exceeds the predetermined value $\beta$, then, a failure occurrence in either one of the main select sensor 38 and the sub select sensor 39 is determined. Furthermore, the predetermined value $\beta$ is preliminarily acquired on experimental tests and calculation and set to a threshold value representing a voltage difference regarded to cause the failure.

Upon detection of the failure in response to the detection signal voltages $V_{SF}$ and $V_{SL}$ of the positional sensors as described above, the failure detecting means 104 outputs a command to the range switching means 102 for switching the shift range of the drive apparatus 40 to the fail-safe mode for the establishment of the "N" range (Neutral range). Upon switch-over to the fail-safe mode, the range switching means 102 switches the shift range to the "N" range such that the vehicle is halted safely regardless of the shift operation of the driver.

Further, the failure detecting means 104 sequentially monitors the detected failed states to determine based on the detection signal voltage of the positional sensor whether the failed state is recovered to the normal state, upon which a signal is output to recovery control means 106 to notify recovery of the positional sensor to the normal state. As used herein, the expression "recovery from the failed state to the normal mode of the positional sensor" corresponds to situations that include: (i) a case wherein a state where the voltage difference $\Delta V_{SF}$ exceeding the predetermined value $\alpha$ varies to another state where the voltage difference $\Delta V_{SF}$ becomes less than the predetermined value $\alpha$ such that the detection signal voltages $V_{SFM}$ and $V_{SFS}$ follow each other; (ii) a case wherein a state where the voltage difference $\Delta V_{SL}$ exceeding the predetermined value $\beta$ varies to another state where the voltage difference $\Delta V_{SL}$ becomes less than the predetermined value $\beta$ such that the detection signal voltages $V_{SLM}$ and $V_{SLS}$ follow each other; and (iii) a case wherein a state where the detection signal voltages $V_{SF}$ and $V_{SL}$ deviated from the regions of the voltage varying ranges $RV_{SF}$ and $RV_{SL}$ are recovered to fall in the above regions and the voltage differences $\Delta V_{SF}$ and $\Delta V_{SL}$ fall in the predetermined values $\alpha$ and $\beta$, respectively.

As set forth above, when the recovery control means 106 is input with the signal representing recovery of the failed state to the normal state, the recovery control means 106 switches the fail-safe mode of the range switching means 102 to the normal control mode (normal control) in response to the state of the vehicle detected by vehicle state detecting means 108.

The vehicle state detecting means 108 detects the state of the vehicle required when the range switching means 102 is switched from the fail-safe mode to the normal control mode. The vehicle state detecting means 108 detects at least one of the vehicle speed V depending on a vehicle speed signal output from a vehicle speed sensor; an accelerator-opening Acc depending on an accelerator-opening signal of an accelerator pedal 87 output from an accelerator-opening sensor 86; a foot brake operation $B_{ON}$ output from a brake switch 84 depending on a brake operation signal of a brake pedal 85; and an acceleration "g" output from an acceleration sensor 88 depending on an acceleration signal. Then, the vehicle state detecting means 108 outputs a detected vehicle state (such as the vehicle speed V, the accelerator-opening Acc, the foot brake $B_{ON}$ and vehicle acceleration "g") to the recovery control means 106.

Upon receipt of the vehicle state from the vehicle state detecting means 108, the recovery control means 106 switches the fail-safe mode to the normal control mode based on the relevant vehicle state. Upon receipt of the recovery signal from the failure detecting means 104 for the establishment of the normal state, the recovery control means 106 determines based on the shift operation detecting means 100 whether the driver has executed the shift operation to the arbitrary shift position $P_{SH}$. If no shift operation has been executed even upon recovery to the normal mode, the recovery control means 106 continues the operation in the fail-safe mode (for running with the "N" range). Consequently, the shift operation of the driver forms one of recovery conditions for switching the fail-safe mode to the normal control mode. In addition, when the switch-over to the normal control mode is performed, the shift range can be switched to the arbitrary shift position selected by the driver.

Further, in switching the fail-safe mode to the normal control mode when the positional sensor is recovered from the failed state to the normal state, the recovery control means 106 alters the recovery conditions depending on the state of the vehicle to determine whether the fail-safe mode is switched to the normal control mode. More particularly, the recovery control means 106 determines if the vehicle speed V is less than a predetermined speed VL that has been preset in association with the state of the vehicle. If the vehicle speed V is less than the predetermined speed VL, then, the recovery conditions for the normal control mode are made strict. If the vehicle speed V lies or falls in the vehicle speed region less than the predetermined speed VL, then, a determination is made whether the accelerator-opening $A_{CC}$ is zeroed, i.e., whether the accelerator pedal 38 remains undepressed (in turn-off operation). In addition, a determination is made whether the foot brake operation is executed (in turn-on operation). Only when the accelerator pedal 38 is undepressed and the brake pedal 85 is depressed, adding the recovery condition for the fail-safe mode to be switched to the normal control mode (under normal control) makes the recovery condition to be strict.

Under a condition where the accelerator pedal 38 is undepressed and the brake pedal 85 is depressed, the variation in the drive force decreases or becomes lessened even if the switch-over to the normal control mode, so that the variation in drive force is not less than the extent against the driver's intention. In such a case, accordingly, the recovery control means 106 outputs the command to the range switching means 102 for switching the fail-safe mode to the normal control mode even during running of the vehicle. Moreover, the term "predetermined vehicle speed VL" represents a value that is preliminarily set on experimental tests to a threshold value in a vehicle-speed region to make the variation in drive force smaller than the predetermined value even if the brake operation $B_{ON}$ is not executed and the accelerator pedal 87 is remained depressed. That is, if the vehicle speed V exceeds the predetermined speed VL, then, the variation in drive force becomes smaller or less than a predetermined value. In addition, the "predetermined value of the variation in drive force" is preset on experimental tests to the extent in that the driver does not have uncomfortable feeling due to the variation in drive force occurring upon switch-over. As set forth above, the vehicle state is likely to be present with an increase in the variation of drive force (the vehicle speed V falling in the predetermined vehicle-speed region less than the predetermined vehicle speed VL) upon switch-over to the normal control mode. In such likelihood, the recovery condition is made stricter (the turn-off operation of the accelerator pedal 87 and the turn-on operation of the brake pedal 85 being added) than that established in the vehicle state with a smaller variation of drive force (the vehicle speed V falling in a region out of the predetermined vehicle-speed region).

Further, the recovery condition for switch-over to the normal control mode may include a halt of the vehicle when a determination is made that the vehicle speed VL is less than the predetermined speed VL (falling in the predetermined vehicle-speed region) regardless of the operating states of the accelerator pedal 87 and the brake pedal 85.

Meanwhile, under a condition where the vehicle speed VL remains in a state (falling in the predetermined vehicle-speed region) less than the predetermined speed VL and the accelerator-opening $A_{CC}$ is not zeroed, i.e., when the accelerator pedal 87 remains depressed (in turn-on operation) or the brake operation $B_{ON}$ is not executed (in turn-off operation), the variation in drive force becomes large or increases upon switch-over to the normal control mode. Thus, the recovery control means 106 outputs a command to the range switching means 102 for inhibiting switch-over to the normal control mode and for continuing the fail-safe mode.

If the vehicle speed VL exceeds the predetermined vehicle speed VL (falling in the value out of the predetermined vehicle-speed region), further, the variation in drive force becomes smaller than the predetermined value upon switch-over from the fail-safe mode to the normal control mode. Thus, the recovery control means 106 outputs a command to the range switching means 102 for performing the switch-over to the normal control mode without considering the recovery condition associated with the operations of the accelerator pedal 87 and the brake pedal 85. Accordingly, the switch-over to the normal control mode is performed during running of the vehicle, and the variation in drive force occurring during relevant switch-over is suppressed to fall in the predetermined value. Furthermore, the recovery control means 106 inhibits the switch-over to the normal control mode based on the shift operation detecting means 100 when the shift lever 32 remains depressed.

Figure 7:
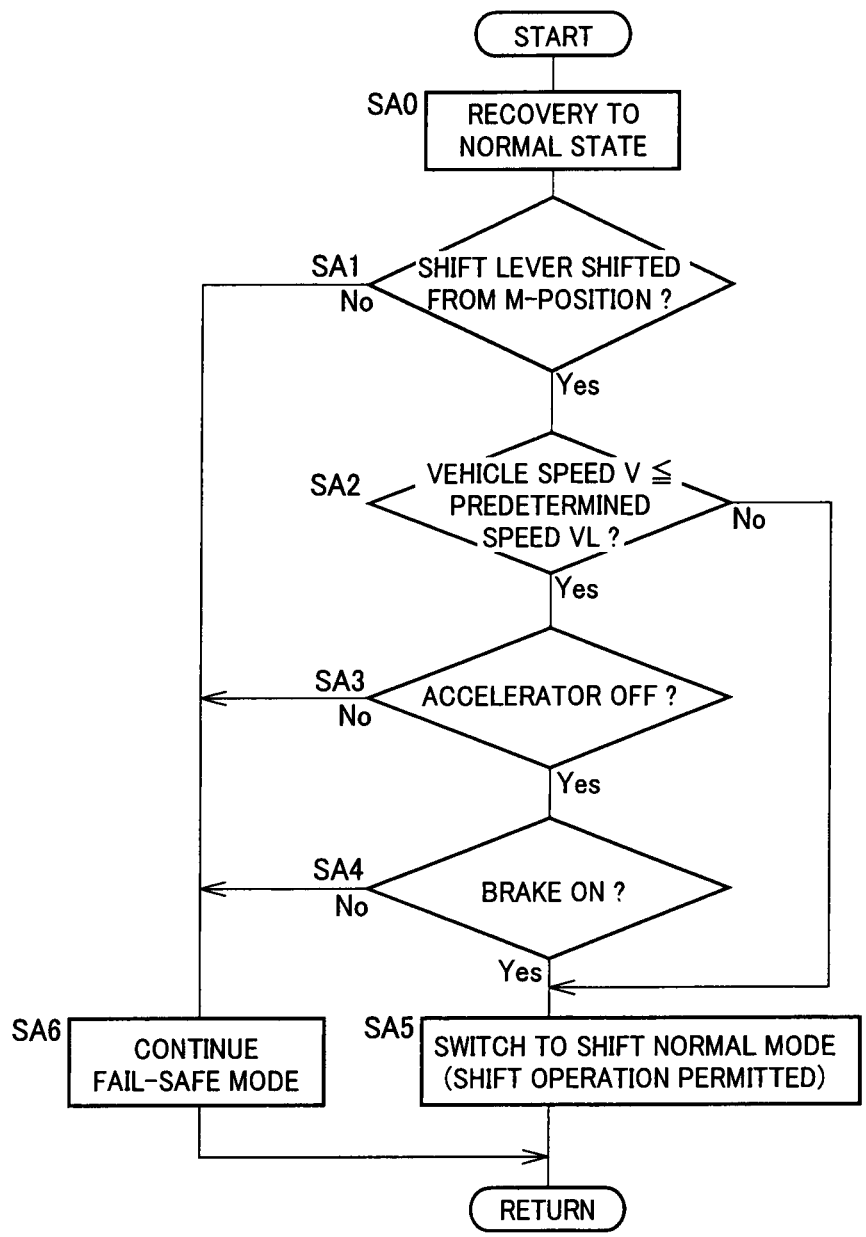
FIG. 7 is a flowchart illustrating a major part of control operations to be executed by the electronic control section, i.e., control operations to perform switch-over to a normal control mode without interrupting running of the vehicle, when a positional sensor is recovered to a normal state during running of the vehicle under a fail-safe mode resulting from a failure detection in the positional sensor.

FIG. 7 is a flow chart illustrating a major part of control operations to be executed by the electronic control section 20, i.e., a basic sequence of control operations for performing the switch-over to the normal control mode without halting the vehicle when the positional sensor is recovered to the normal state during running of the vehicle under the fail-safe mode due to detected failure of the positional sensor. Such a basic sequence is repeatedly executed on an extremely short cycle time in the order of, for instance, several milliseconds to several tens milliseconds.

First at step SA0 (hereunder, the term "step" will be omitted) corresponding to the failure detecting means 104, the failure of the positional sensor (either one of the shift sensors 36 and 37 and the select sensors 38 and 39) is detected, upon which a determination is made that during running of the vehicle under a state switched to the fail-safe mode, the positional sensor is recovered from the failed state to the normal state. Then, at SA1 corresponding to the shift operation detecting means 100 and the recovery control means 106, a determination is made whether the driver executes the shift operation to the arbitrary shift position $P_{SH}$. If the answer to SA1 is negative, then, at SA6 corresponding to the range switching means 102, execution is continued in the fail-safe mode. Further, under a situation where the shift lever 32 remains depressed, likewise, the routine goes to SA6, in which the switch-over to the normal control mode is inhibited and the fail-safe mode is continuously executed.

If the answer to SA1 is positive, then, at SA2 corresponding to the vehicle state detecting means 108 and the recovery control means 106, a determination is made whether the vehicle speed V is less than the predetermined speed VL (within the predetermined vehicle-speed region). If the answer to SA2 is positive, then, at SA3 corresponding to the vehicle state detecting means 108 and the recovery control means 106, a determination is made whether the accelerator pedal 87 remains undepressed in the turn-off operation, i.e., whether the accelerator-opening Acc is zeroed. If the answer to SA3 is negative, then, the vehicle speed V is less than the predetermined speed VL (within the predetermined vehicle-speed region) and the accelerator pedal 87 is remained depressed (in the turn-on operation). Thus, a determination is made that the variation in drive force exceeds the predetermined value upon switch-over to the normal control mode, upon which at SA6, execution is continued in the fail-safe mode. On the contrary, if the answer to SA3 is positive, then, at SA4 corresponding to the vehicle state detecting means 108 and the recovery control means 106, whether the brake operation $B_{ON}$ is executed (in the turn-on operation) is determined. If the answer to SA4 is negative, then, a determination is made that the variation in drive force exceeds the predetermined value upon switch-over to the normal control mode, upon which at SA6, execution is continued in the fail-safe mode.

In contrast, if the answer to SA4 is positive, then, even when the vehicle speed V is less than the predetermined speed VL, a determination is made in response to the turn-off operation of the accelerator pedal 87 and the turn-on operation of the brake pedal 85 that the variation in drive force becomes small upon switch-over to the normal control mode. At SA5 corresponding to the range switching means 102, therefore, switch-over to the normal control mode is performed. On the other hand, if the answer to SA2 is negative, the vehicle speed V exceeds the predetermined speed VL (a value out of the predetermined vehicle-speed region). This determines that the variation in drive force becomes small upon switch-over to the normal control mode, upon which switch-over to the normal control mode is performed.

In the flow chart described above, further, in place of steps SA3 and SA4, step may be executed based on for instance the vehicle speed V to determine whether the vehicle is halted. During running of the vehicle, at SA6, execution is continued in the fail-safe mode, and when the vehicle is halted, at SA5, switch-over to the normal control mode is performed.

As set forth above, according to the first embodiment, when the shift operation detection is recovered from a failed state to a normal state and the range switching means 102 is switched from the fail-safe mode to a normal control mode, a recovery condition for determining switching of the fail-safe mode to the normal control mode is altered depending on the vehicle state. This makes it possible to perform switch-over to the normal control mode under a running state of the vehicle with suppressing the variation in the drive force during the switch-over on the basis of the recovery condition.

According to first embodiment, the vehicle state detected by the vehicle state detecting means 108 is a vehicle speed V. Accordingly, detecting the vehicle speed V allows the recovery condition to be suitably altered. Thus, the switch-over to the normal control mode is executed under the running state of the vehicle with suppressing the variation in the drive force during the switch-over.

According to the first embodiment, in the vehicle state where a variation in the drive force is large, the recovery condition is made stricter than that in the vehicle state where the variation in the drive force is small upon switch-over to the normal control mode. In the vehicle state where for instance variation in drive force is large, the recovery condition for the normal control mode is made strict. Thus, the fail-safe mode is less likely switched to the normal control mode, thereby preventing the variation in drive force against the driver's intention that would otherwise occur upon switch-over to the normal control mode. In addition, in the vehicle state where variation in drive force is small, the fail-safe mode can be easily switched to the normal control mode. Thus, the normal control mode can be switched under the running state of the vehicle with suppressing the variation in drive force caused against the driver's intention.

According to the first embodiment, a predetermined vehicle-speed region in which the variation in the drive force becomes large upon switch-over to the normal control mode is preset. The switch-over to the normal control mode is performed out of the predetermined vehicle-speed region, and in the predetermined vehicle-speed region, the switch-over to the normal control mode is performed under the recovery condition including a turn-off operation of an accelerator pedal 87 and a turn-on operation of a brake pedal 85. With such operation, when the vehicle state is out of the predetermined vehicle-speed VL region, there is no relative increase in the variation in drive force occurring upon switch-over to the normal control mode, performing switch-over to the normal control mode under the running state of the vehicle. In contrast, when the vehicle state is in the predetermined vehicle-speed VL region, no switch-over to the normal control mode is performed and the fail-safe mode is continuously executed, unless the recovery condition is established including at least one of the turn-off operation of the accelerator pedal 87 and the turn-on operation of the brake pedal 85. Thus, the switch-over to the normal control mode is executed under the running state of the vehicle with suppressing the variation in drive force caused upon switch-over to the normal control mode.

According to the first embodiment, the predetermined vehicle-speed region (vehicle speed region smaller than the vehicle speed VL) in which the variation in the drive force is large upon switch-over to the normal control mode is preset. The switch-over to the normal control mode is performed out of the predetermined vehicle-speed region, and in the predetermined vehicle-speed region, the switch-over to the normal control mode is performed under the recovery condition in which the vehicle is halted. With such a recovery condition, when the vehicle state is out of the predetermined vehicle-speed region, there is no relative increase in the variation in drive force occurring upon switch-over to the normal control mode, performing switch-over to the normal control mode under the running state of the vehicle. In contrast, when the vehicle state falls in the predetermined vehicle-speed region, no switch-over to the normal control mode is performed and the fail-safe mode is continuously executed, unless the vehicle is halted. Thus, the variation in drive force occurring upon switch-over to the normal control mode can be suppressed.

According to the first embodiment, the shift operation detecting means 100 has two positional sensors for the respective operation directions (longitudinal directions and lateral directions) for the shift levers 32. When recovery of the shift operation detection from the failed state to the normal state is determined in response to detection signal voltages from the sensors, the range switching means 102 is switched from the fail-safe mode to the normal control mode in synchronism with the shift operation of the driver. With such a determination, the shift operation of the driver and switch-over to the normal control mode can be synchronously performed with each other, thereby preventing the vehicle from running against the driver's intention.

According to the first embodiment, the fail-safe mode in the failure of the shift operation detection is to switch a shift range to a neutral range. This prevents the vehicle from running against the driver's intention in the failure state, thereby halting the vehicle in safe.

According to the of the first embodiment, a shift lever 32 operatively shifted by the driver is a momentary type lever. This makes it impossible for the driver to determine the shift range in terms of the shift range. Consequently, establishing the neutral range as the fail-safe prevents the vehicle from running against the driver's intention.

According to the first embodiment, when the shift lever 32 is pressed down, the switch-over to the normal control mode is inhibited. Therefore, under a condition where the shift lever 32 is pressed down, the fail-safe mode is continued and the switch-over to the normal control mode is not executed, unless the shift lever 32 is returned to a momentary home position once. Accordingly, the vehicle from running against the driver's intention can be prevented.

Next, another embodiment of the present invention will be described below. In the following description, components parts common to those of the previous embodiment are added the same reference numerals to omit redundant description.

Embodiment 2

Figure 8:
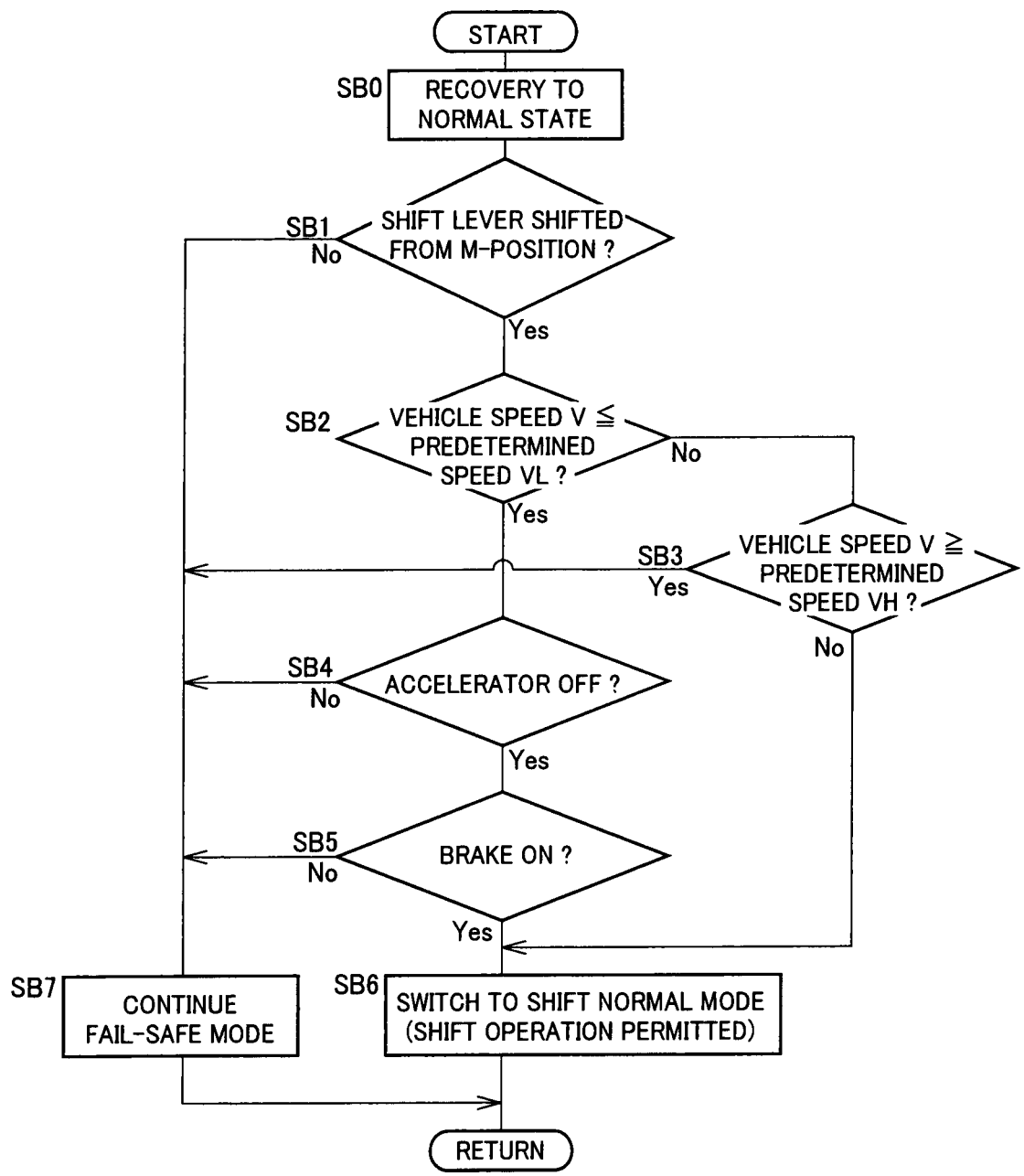
FIG. 8 is another flowchart illustrating a major part of control operations to be executed by the electronic control section, i.e., control operations to perform switch-over to a normal control mode without interrupting running of the vehicle, when a positional sensor is recovered to a normal state during running of the vehicle under a fail-safe mode resulting from a failure detection in the positional sensor.

FIG. 8 is another flow chart illustrating a major part of control operations to be executed by the electronic control section 20, i.e., a basic sequence of control operations for performing the switch-over to the normal control mode without halting the vehicle when the positional sensor is recovered to the normal state during running of the vehicle under the fail-safe mode due to failure detection of the positional sensor. Further, the present embodiment fundamentally has the same mechanical structure and functions of the control means as those of the previous embodiment and, hence, related description will be omitted herein.

First at step SB0 (hereunder, the term "step" will be omitted) corresponding to the failure detecting means 104, the failure of the positional sensor (either one of the shift sensors 36 and 37 and the select sensors 38 and 39) is detected, upon which a determination is made that the positional sensor is recovered from the failed state to the normal state during running of the vehicle under a state switched to the fail-safe mode. Then, at SB1 corresponding to the shift operation detecting means 100 and the recovery control means 106, a determination is made whether the driver executes the shift operation to the arbitrary shift position $P_{SH}$. If the answer to SB1 is negative, then, at SB7 corresponding to the range switching means 102, execution is continued in the fail-safe mode.

If the answer to SB1 is positive, then, at SB2 corresponding to the vehicle state detecting means 108 and the recovery control means 106, a determination is made whether the vehicle speed V is less than the predetermined speed VL that has been preset. If the answer to SB2 is positive, then, at SB4 corresponding to the vehicle state detecting means 108 and the recovery control means 106, a determination is made whether the accelerator pedal 87 remains in the turn-off operation. If the answer to SB4 is negative, then, since the vehicle speed V is less than the predetermined speed VL and the accelerator pedal 87 is remained depressed (in the turn-on operation), a determination is made that the variation in drive force becomes large upon switch-over to the normal control mode, upon which at SB7 execution is continued in the fail-safe mode. On the contrary, if the answer to SB4 is positive, at SB5 corresponding to the vehicle state detecting means 108 and the recovery control means 106, a determination is made whether the brake 85 is depressed. If the answer to SB5 is negative, then, a determination is made that the variation in drive force becomes large upon switch-over to the normal control mode, upon which at SB7 execution is continued in the fail-safe mode.

In contrast, if the answer to SB5 is positive, then, a determination is made in response to the turn-off operation of the accelerator pedal 87 and the turn-on operation of the brake pedal 85 that the variation in drive force becomes large upon switch-over to the normal control mode. At SB6 corresponding to the range switching means 102, switch-over to the normal control mode (in shift normal control) is conducted.

If the answer to SB2 is negative, then, at SB3 corresponding to the vehicle state detecting means 108 and the recovery control means 106, a determination is made whether the vehicle speed V exceeds or is larger than an upper-limit vehicle speed VH. Here, the upper-limit vehicle speed VH represents a vehicle speed falling in the high vehicle-speed region that has been preset and is set to a speed at a threshold value at which upon switch-over to for instance the "D" range, the large engine braking is generated to cause the rapid deceleration. If the answer to SB3 is positive, since the vehicle speed V exceeds the upper-limit vehicle speed VH, rapid deceleration is likely generated due to a rapid decelerating force being generated upon switch-over to the "D" range. Thus, at SB7, switch-over to the normal control mode is inhibited and the fail-safe mode is continuously executed, so that the occurrence of rapid deceleration is prevented. In contrast, if the answer to SB3 is negative, since the vehicle speed V lies at a speed between the predetermined vehicle speed VL and the upper-limit vehicle speed VH, a determination is made that the variation in drive force becomes small upon switch-over to the normal control mode, upon which switch-over to the normal control mode is performed.

As set forth above, the embodiment 2 has the same advantageous effects as those of the previous embodiment. In addition, if the vehicle speed V is higher than the upper-limit vehicle speed VH that has been preliminarily determined, switch-over to the normal control mode is inhibited. This prevents the occurrence of rapid deceleration caused by the engine braking that is generated in the presence of switch-over to the normal control mode.

Figure 9:
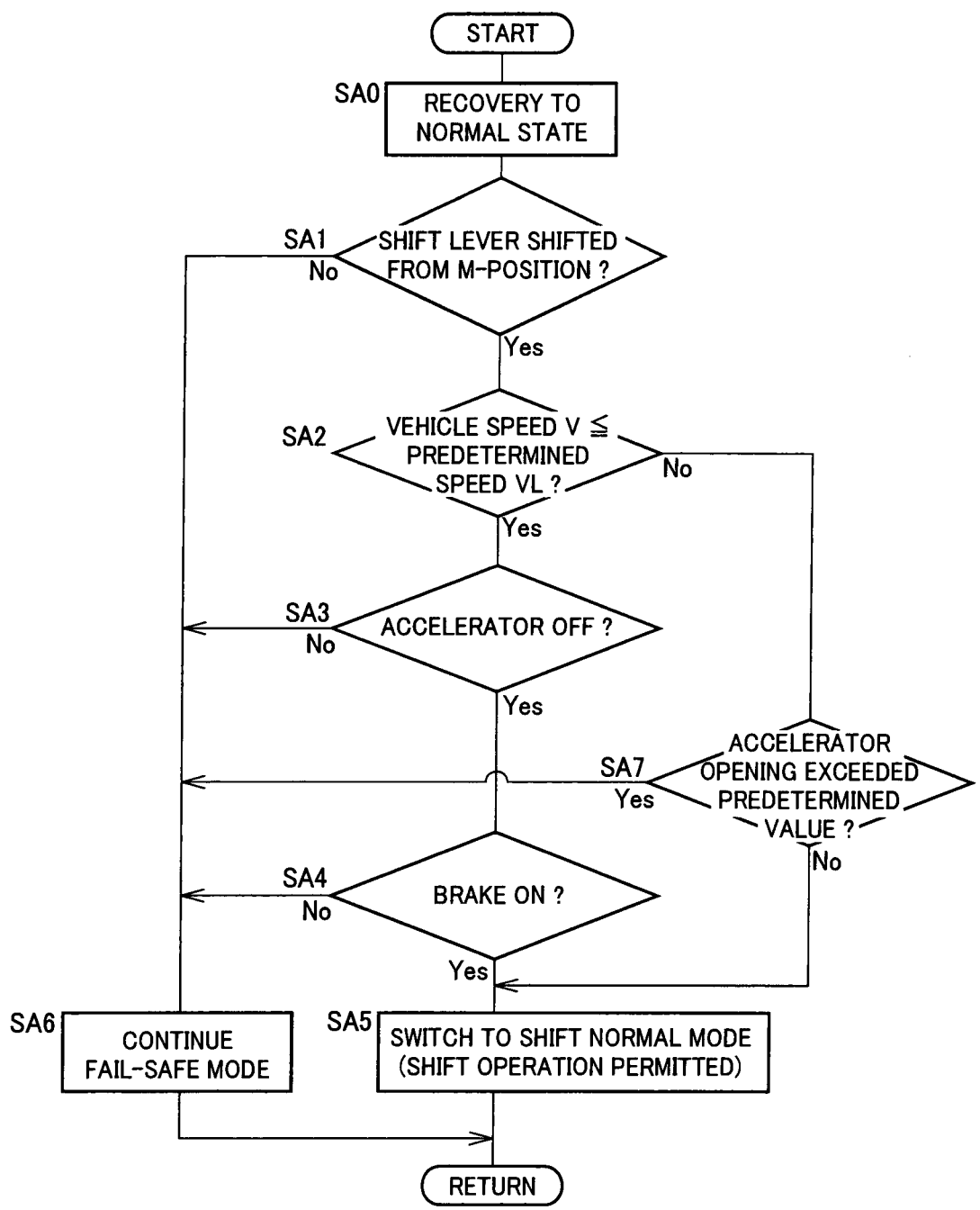
FIG. 9 is still another flowchart illustrating a major part of control operations to be executed by the electronic control section, i.e., control operations to perform switch-over to a normal control mode without interrupting running of the vehicle, when a positional sensor is recovered to a normal state during running of the vehicle under a fail-safe mode resulting from a failure detection in the positional sensor.

FIG. 9 is another flow chart illustrating a major part of control operations to be executed by the electronic control section 20, i.e., a basic sequence of control operations for performing the switch-over to the normal control mode without halting the vehicle when the positional sensor is recovered to the normal state during running of the vehicle under the fail-safe mode due to failure detection of the positional sensor. The flowchart of FIG. 9 is basically the same as that in FIG. 7, except for addition of step SA7, and accordingly explanations of another steps will be omitted.

If the answer to SA2 is negative, i.e., when the vehicle speed V exceeds the upper-limit vehicle speed VH, the routine proceeds to SA7 corresponding to the vehicle state detecting means 108 and the recovery control means 106. At SA7, a determination is made whether the accelerator-opening Acc representing an operating stroke of the accelerator pedal 87 exceeds a predetermined value γ. Here, the predetermined value γ represents a value, preset on experimental tests, which is set with the premise that even if the vehicle speed V lies in the vehicle-speed region regarded to have the small variation in drive force, the variation in drive force will become large depending on the accelerator-opening Acc. Accordingly, the predetermined value γ is determined so as to suppress the variation in drive force under a region where the accelerator-opening Acc is less than the predetermined value γ. In addition, for the same accelerator-opening Acc, the drive force varies at different rates depending on the vehicle speed V, the predetermined value γ may be preferable varied depending on the vehicle speed V.

If the answer to SA7 is positive, then, a determination is made that the variation in drive force will becomes large upon switch-over to the normal control mode, and at SA6, execution is continued in the fail-safe mode. On the contrary, if the answer to SA7 is negative, then, a determination is made that the variation in drive force is suppressed upon switch-over to the normal control mode, and at SA5, switch-over to the normal control mode is executed.

As set forth above, the embodiment 3 has the same advantageous effects as those of the previous embodiment 1. Also, adding the recovery condition depending on the accelerator-opening Acc can suppress the variation in drive force upon switch-over to the normal control mode with increased precision.

Figure 10:
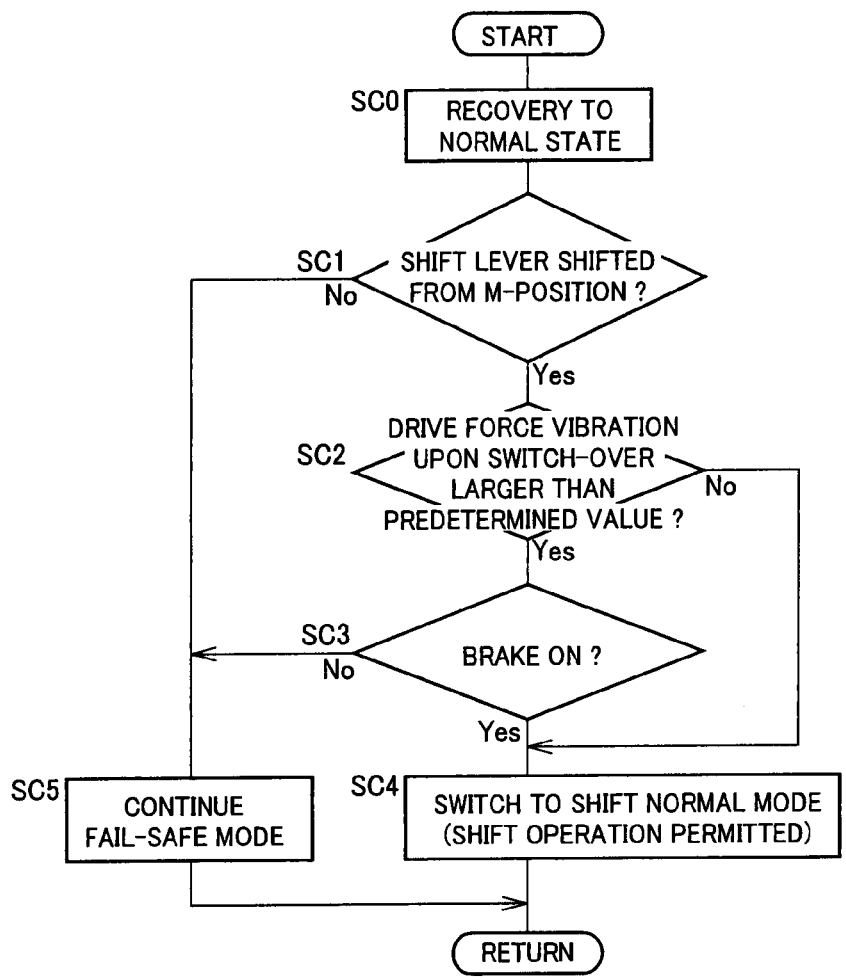
FIG. 10 is still another flowchart illustrating a major part of control operations to be executed by the electronic control section, i.e., control operations to perform switch-over to a normal control mode without interrupting running of the vehicle, when a positional sensor is recovered to a normal state during running of the vehicle under a fail-safe mode resulting when a failure in the positional sensor is detected.

FIG. 10 is another flow chart illustrating a major part of control operations to be executed by the electronic control section 20, i.e., a basic sequence of control operations for performing the switch-over to the normal control mode without halting the vehicle when the positional sensor is recovered to the normal state during running of the vehicle under the fail-safe mode due to failure detection of the positional sensor. Further, the present embodiment fundamentally has the same mechanical structure and functions of the control means as those of the previous embodiment and hence, related description will be omitted herein.

First at step SC0 (hereunder, the term "step" will be omitted) corresponding to the failure detecting means 104, the failure in the positional sensor (either one of the shift sensors 36 and 37 and the select sensors 38 and 39) is detected, upon which a determination is made that during running of the vehicle under the state switched to the fail-safe mode, the positional sensor is recovered from the failed state to the normal state. Then, at SC1 corresponding to the shift operation detecting means 100 and the recovery control means 106, a determination is made whether the driver executes the shift operation to the arbitrary shift position $P_{SH}$. If the answer to SC1 is negative, then execution is continued in the fail-safe mode at SC5 corresponding to the range switching means 102.

Figure 11:
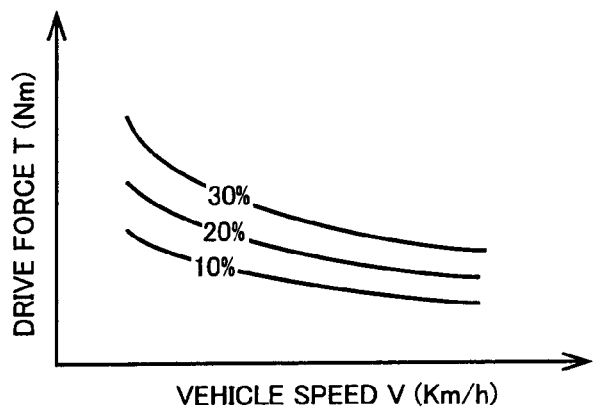
FIG. 11 is a view showing one example of a drive-force map.

If the answer to SC1 is positive, at SC2 corresponding to the vehicle state detecting means 108 and the recovery control means 106, then a determination is made whether the variation in drive force occurring upon switch-over to the normal control mode exceeds a predetermined value. Here, the drive force associated with a vehicle state of the present embodiment is calculated by referring to a known drive-force map that is preset as, for instance, shown in FIG. 11. With the drive-force map shown in FIG. 11, the drive force T is plotted on the longitudinal axis, the vehicle speed V is plotted on the horizontal axis, and drive-force curves is drawn on patterns depending on the accelerator-opening Acc. As will be apparent from FIG. 11, by detecting the vehicle speed V and the accelerator-opening Acc, the drive force at the time can be calculated. Then, a determination is made whether the resulting drive force exceeds a predetermined value Ta. Here, the term "drive force Ta" refers to a preset value and is set to a threshold value falling in the drive force range that can suppress the variation in drive force generated upon switch-over to the normal control mode.

If the answer to SC2 is positive, then, a determination is made whether the brake pedal 85 is depressed. If the answer to SC3 is negative, then, a determination is made that the variation in drive force becomes large upon switch-over to the normal control mode, upon which at SC5 corresponding to the range switching means 102, execution is continued in the fail-safe mode. On the contrary, if the answer to SC3 is positive, then, a determination is made in response to the depressing operation of the brake pedal 85 that the variation in drive force becomes large upon switch-over to the normal control mode, upon which at SC4 corresponding to the range switching means 102, switch-over to the normal control mode (in shift normal control) is executed.

If the answer to SC2 is negative, then, a determination is made that the variation in drive force is suppressed upon switch-over to the normal control mode, upon which at SC4 switch-over to the normal control mode (in shift normal control) is executed.

With the present embodiment 4, as set forth above, the vehicle state detected by the vehicle state detecting means 108 is the drive force, and hence, the recovery condition can be altered in response to the drive force. Accordingly, calculating the drive force can alter the recovery condition preferably. This can suppress the variation in drive force generated upon switch-over to the normal control mode, and conduct switch-over to the normal control mode under the vehicle running state.

Figure 12:
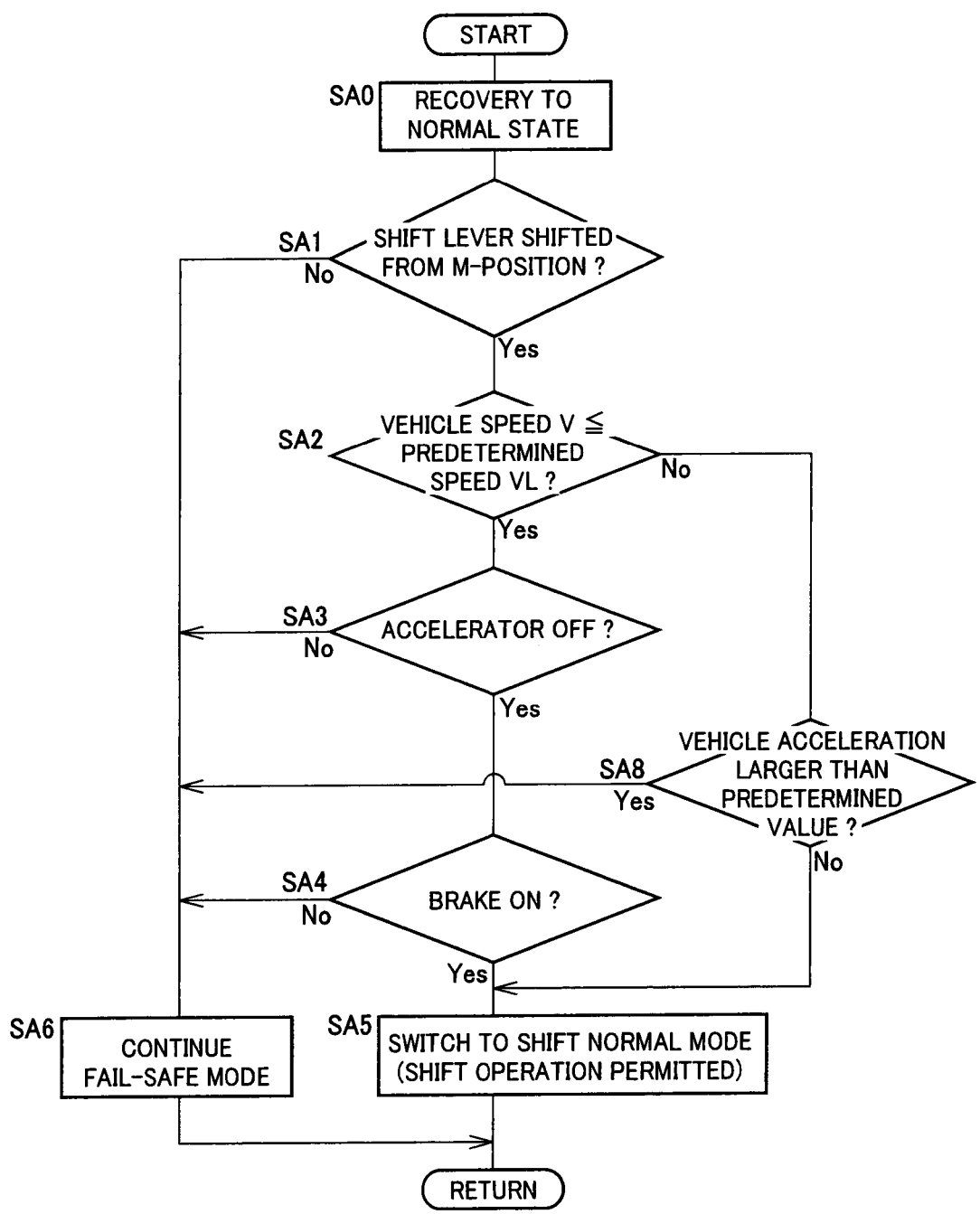
FIG. 12 is still another flowchart illustrating a major part of control operations to be executed by the electronic control section, i.e., control operations to perform switch-over to a normal control mode without interrupting running of the vehicle, when a positional sensor is recovered to a normal state during running of the vehicle under a fail-safe mode resulting from a failure detection in the positional sensor.

FIG. 12 is another flow chart illustrating a major part of control operations to be executed by the electronic control section 20, i.e., a basic sequence of control operations for performing the switch-over to the normal control mode without halting the vehicle when the positional sensor is recovered to the normal state during running of the vehicle under the fail-safe mode due to failure detection of the positional sensor. The flowchart of FIG. 12 is basically the same as that in FIG. 7, except for addition of step SA8, and accordingly explanations of another steps will be omitted.

If the answer to SA2 is negative, i.e., when the vehicle speed exceeds the predetermined vehicle speed VL, the routine goes to SA8. At SA8 corresponding to the detecting means 108 and the recovery control means 106, a determination is made whether the vehicle acceleration "g" detected by the acceleration sensor 88 is greater than a predetermined value "ga". Here, the predetermined value "go" of the vehicle acceleration "g" is a value that is preset on experimental tests and set to a threshold value of the vehicle acceleration "g", at which switching-over to the normal control mode during an accelerating state or a decelerating state makes the vehicle unstable.

If the answer to SA8 is positive, then, a determination is made that the vehicle becomes unstable upon switch-over to the normal control mode, and at SA6, execution is continued in the fail-safe mode. In contrast, if the answer to SA8 is negative, then, a determination is made that the vehicle becomes stable upon switch-over to the normal control mode, and at SA5, switch-over to the normal control mode is conducted.

As set forth above, the present embodiment 5 has the same advantageous effects as those of the embodiment 1 described above. In addition, if the vehicle acceleration "g" is greater than the predetermined value "ga", switch-over to the normal control mode is inhibited, which means that switch-over to the normal control mode can be conducted under the stable vehicle state.

In the foregoing, although the present invention has been described above with reference to the various embodiments shown in the drawings, the present invention may be implemented in various other modes.

In the illustrated embodiments, as set forth above, in the region of vehicle speed less than the predetermined vehicle speed VL, switch-over to the normal control mode is executed in response to the turn-off operation of the accelerator pedal 87 and the turn-on operation of the brake pedal 85. However, the switch-over to the normal control mode may be executed based on a determination resulting from either one of the turn-off operation of the accelerator pedal 87 and the turn-on operation of the brake pedal 85.

In the illustrated embodiments, further, the four positional sensors are required because of the structure of the shift lever 32 operable in the two-dimensional mode (in vertical and lateral directions). However, the use of such a shift lever 32 having one-dimensionally operating capability enables the present invention to be implemented using two positional sensors.

In the illustrated embodiments, furthermore, after the determination on the vehicle speed, the determination is made whether the accelerator pedal 87 remains turned off. However, the determination on the vehicle speed can be made upon turn-off determination of the accelerator pedal 87. That is, in the flow chart shown in FIG. 7, for instance, steps SA2 and SA3 can be executed in an interchanged order.

The plural embodiments described above may be suitably implemented in combination with each other with, for instance, a change in priority sequence.

It is intended that the present invention described be considered only as illustrative of one embodiment, and that the present invention may be implemented in various modifications and improvements based on knowledge of those skilled in the art.

The invention claimed is:

1. A shift control device for a vehicle of shift-by-wire type having shift operation detecting means electrically detecting a shift operation of a driver, range switching means switching a shift range in response to the shift operation of the driver, failure detecting means detecting a failure in a shift operation detection executed by the shift operation detecting means, and vehicle state detecting means detecting a vehicle state upon detection of the failure in the shift operation detection, the range switching means being switched to a fail-safe mode, when the shift operation detection is recovered from a failed state to a normal state and the range switching means is switched from the fail-safe mode to a normal control mode, a recovery condition for determining switching of the fail-safe mode to the normal control mode being altered depending on the vehicle state.

2. The shift control device for a vehicle according to claim 1, wherein the vehicle state detected by the vehicle state detecting means includes a drive force, a vehicle speed or acceleration.

3. The shift control device for a vehicle according to claim 2, wherein a predetermined vehicle-speed region in which a variation in the drive force becomes larger than a predetermined value upon switch-over to the normal control mode is preliminarily determined; and
in a case where the vehicle speed lies in the predetermined vehicle-speed region, the recovery condition is made stricter than that in a case where the vehicle speed does not lie in the predetermined vehicle-speed region upon switch-over to the normal control mode.

4. The shift control device for a vehicle according to claim 3, wherein:
the switch-over to the normal control mode is performed out of the predetermined vehicle-speed region; and
in the predetermined vehicle-speed region, the switch-over to the normal control mode is performed under the recovery condition including at least one of a turn-off operation of an accelerator pedal and a turn-on operation of a brake pedal.

5. The shift control device for a vehicle according to claim 3, wherein:
a predetermined vehicle-speed region in which the variation in the drive force is large upon switch-over to the normal control mode is preliminarily determined;
the switch-over to the normal control mode is performed out of the predetermined vehicle-speed region; and
in the predetermined vehicle-speed region, the switch-over to the normal control mode is performed under the recovery condition in which the vehicle is halted.

6. The shift control device for a vehicle according to claim 4, wherein:
a predetermined vehicle-speed region in which the variation in the drive force is large upon switch-over to the normal control mode is preliminarily determined;
the switch-over to the normal control mode is performed out of the predetermined vehicle-speed region; and
in the predetermined vehicle-speed region, the switch-over to the normal control mode is performed under the recovery condition in which the vehicle is halted.

7. The shift control device for a vehicle according to claim 4, wherein when the vehicle speed is higher than an upper-limit vehicle speed preliminarily determined, the switch-over to the normal control mode is inhibited.

8. The shift control device for a vehicle according to claim 5, wherein when the vehicle speed is higher than an upper-limit vehicle speed preliminarily determined, the switch-over to the normal control mode is inhibited.

9. The shift control device for a vehicle according to claim 6, wherein when the vehicle speed is higher than an upper-limit vehicle speed preliminarily determined, the switch-over to the normal control mode is inhibited.

10. The shift control device for a vehicle according to claim 4, wherein when the acceleration is larger than a predetermined acceleration, the switch-over to the normal control mode is inhibited.

11. The shift control device for a vehicle according to claim 5, wherein when the acceleration is larger than a predetermined acceleration, the switch-over to the normal control mode is inhibited.

12. The shift control device for a vehicle according to claim 6, wherein when the acceleration is larger than a predetermined acceleration, the switch-over to the normal control mode is inhibited.

13. The shift control device for a vehicle according to claim 7, wherein when the acceleration is larger than a predetermined acceleration, the switch-over to the normal control mode is inhibited.

14. The shift control device for a vehicle according to claim 8, wherein when the acceleration is larger than a predetermined acceleration, the switch-over to the normal control mode is inhibited.

15. The shift control device for a vehicle according to claim 9, wherein when the acceleration is larger than a predetermined acceleration, the switch-over to the normal control mode is inhibited.

16. The shift control device for a vehicle according to claim 2, wherein the drive force is calculated based on a drive-force map including the vehicle speed and an accelerator-opening.

17. The shift control device for a vehicle according to claim 1, wherein:
the shift operation detection is executed by at least two sensors; and
when recovery of the shift operation detection from the failed state to the normal state is determined in response to detection signal voltages from the sensors, the range switching means is switched from the fail-safe mode to the normal control mode in synchronism with the shift operation of the driver.

18. The shift control device for a vehicle according to claim 1, wherein the fail-safe mode in the failure of the shift operation detection is to switch a shift range to a neutral range.

19. The shift control device for a vehicle according to claim 1, wherein a shift lever operatively shifted by the driver is a momentary type lever.

20. The shift control device for a vehicle according to claim 19, wherein when the shift lever is pressedly operated, the switch-over to the normal control mode is inhibited.

* * * * *